United States Patent
Yamaguchi et al.

(10) Patent No.: US 11,014,372 B2
(45) Date of Patent: May 25, 2021

(54) PRINTING APPARATUS, CONTROL METHOD THEREOF AND STORAGE MEDIUM

(71) Applicant: CANON KABUSHIKI KAISHA, Tokyo (JP)

(72) Inventors: Hiromitsu Yamaguchi, Yokohama (JP); Fumitaka Goto, Tokyo (JP); Yuto Kajiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/386,568

(22) Filed: Apr. 17, 2019

(65) Prior Publication Data
US 2019/0344581 A1  Nov. 14, 2019

(30) Foreign Application Priority Data

May 14, 2018  (JP) .............................. JP2018-093046

(51) Int. Cl.
| | | |
|---|---|---|
| *B41J 29/38* | (2006.01) | |
| *B41J 2/21* | (2006.01) | |
| *B41J 2/045* | (2006.01) | |
| *B41J 11/00* | (2006.01) | |
| *C09D 11/322* | (2014.01) | |

(52) U.S. Cl.
CPC ......... *B41J 2/2107* (2013.01); *B41J 2/04573* (2013.01); *B41J 11/007* (2013.01); *C09D 11/322* (2013.01)

(58) Field of Classification Search
None
See application file for complete search history.

(56) References Cited

U.S. PATENT DOCUMENTS

| | | | |
|---|---|---|---|
| 8,678,551 B2* | 3/2014 | Yoshida | ................. B41J 2/2117 347/43 |
| 10,071,569 B2 | 9/2018 | Ochi et al. | |
| 2016/0271935 A1* | 9/2016 | Miyamoto | ............. B41J 2/2132 |
| 2017/0282540 A1* | 10/2017 | Ochi | ........................ B41J 2/15 |

FOREIGN PATENT DOCUMENTS

JP      2016055463 A     4/2016

OTHER PUBLICATIONS

U.S. Appl. No. 16/436,990, Fumitaka Goto, Hiromitsu Yamaguchi, Yuto Kajiwara, filed Jun. 11, 2019.

* cited by examiner

*Primary Examiner* — Erica S Lin
*Assistant Examiner* — Tracey M McMillion
(74) *Attorney, Agent, or Firm* — Venable LLP

(57) ABSTRACT

An object is to attain both a high-quality metallic color representation and suppression of a reduction in life of a nozzle. The present invention is a printing apparatus including: a conveyance unit configured to convey a printing medium in a first direction; a printing unit including a metallic array in which a plurality of printing elements for applying a metallic ink including metal particles is arrayed along the first direction and a color array in which a plurality of printing elements for applying a color ink including a color material is arrayed along the first direction; a scan unit configured to cause the printing unit to scan a plurality of times in a second direction intersecting with the first direction for a predetermined area on a printing medium; and a print control unit configured to control a printing operation so as to print a metallic color image.

15 Claims, 23 Drawing Sheets

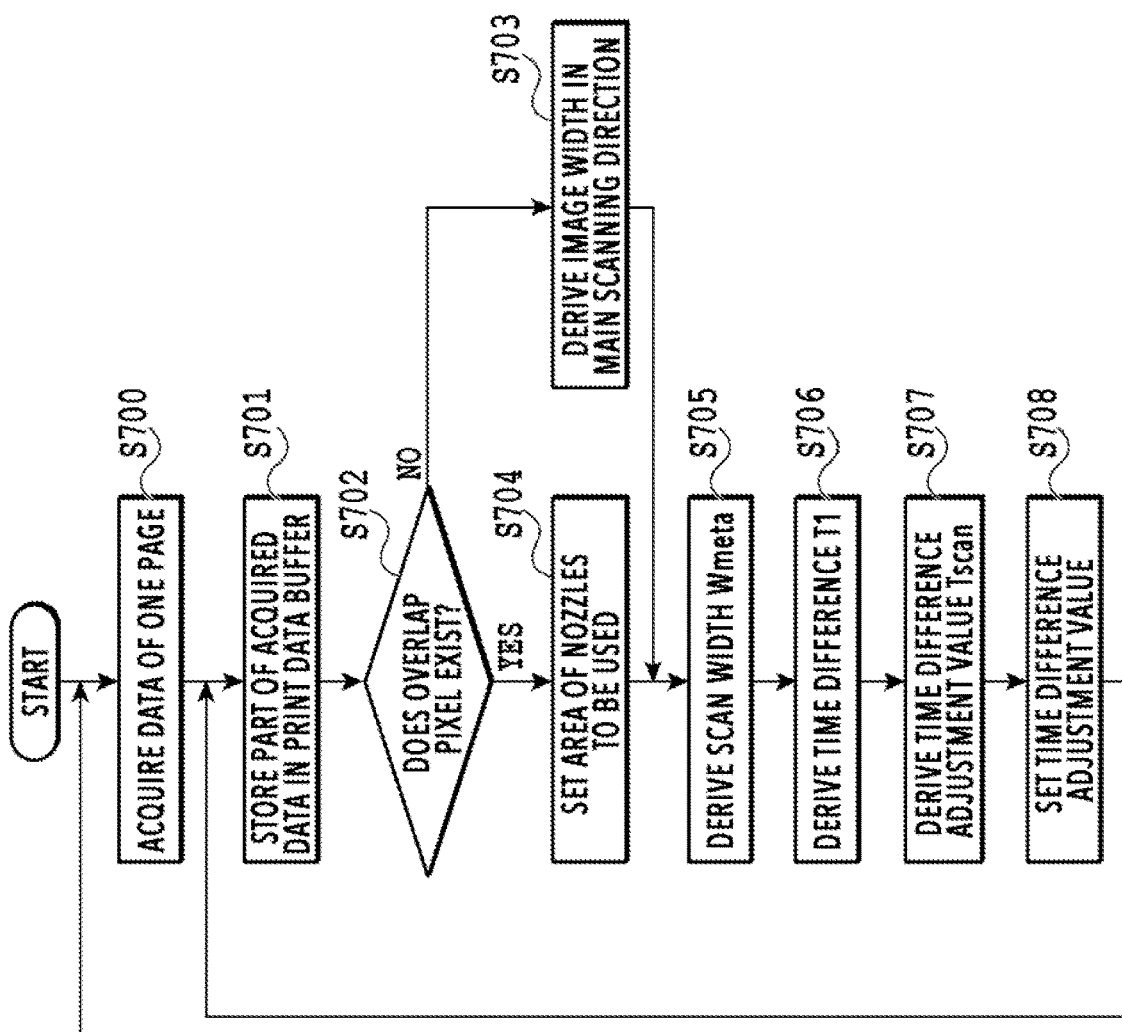

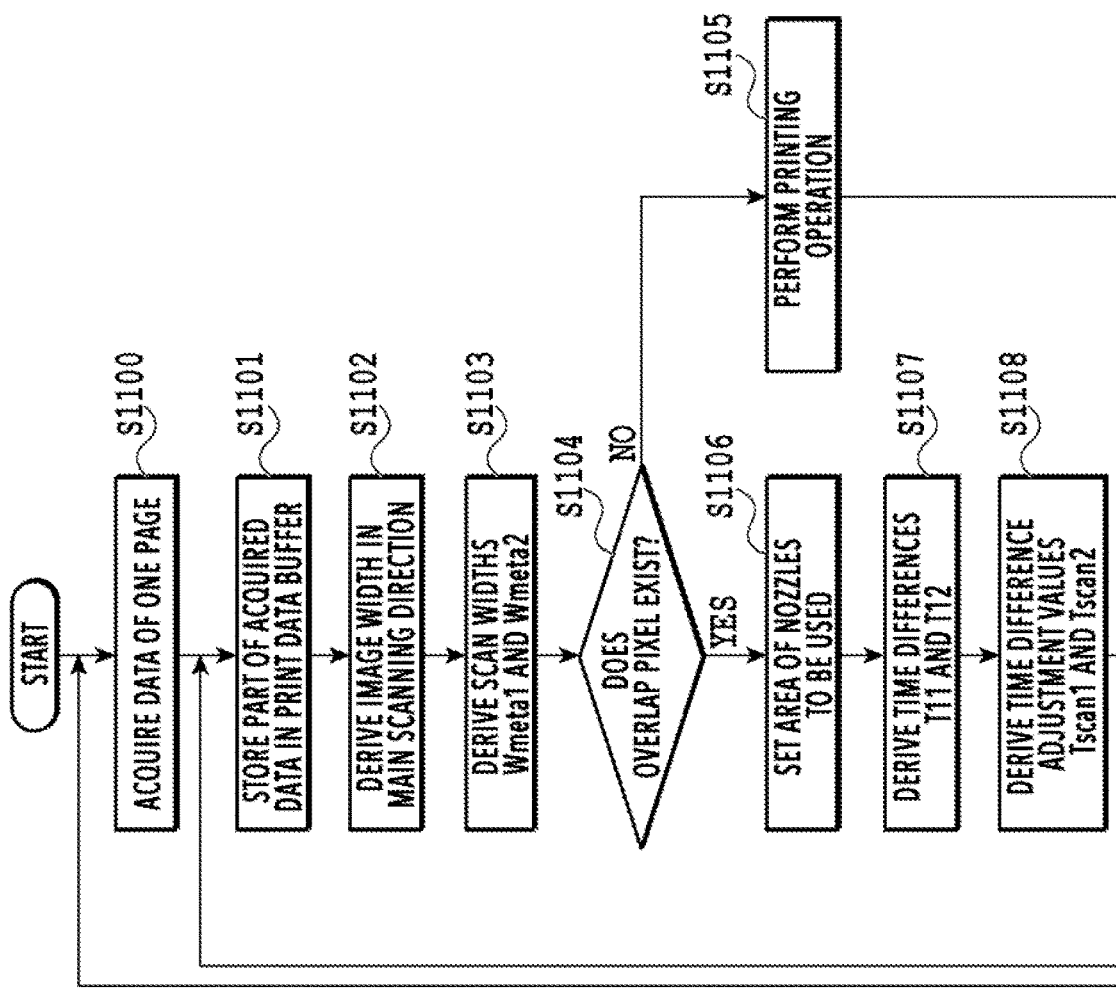

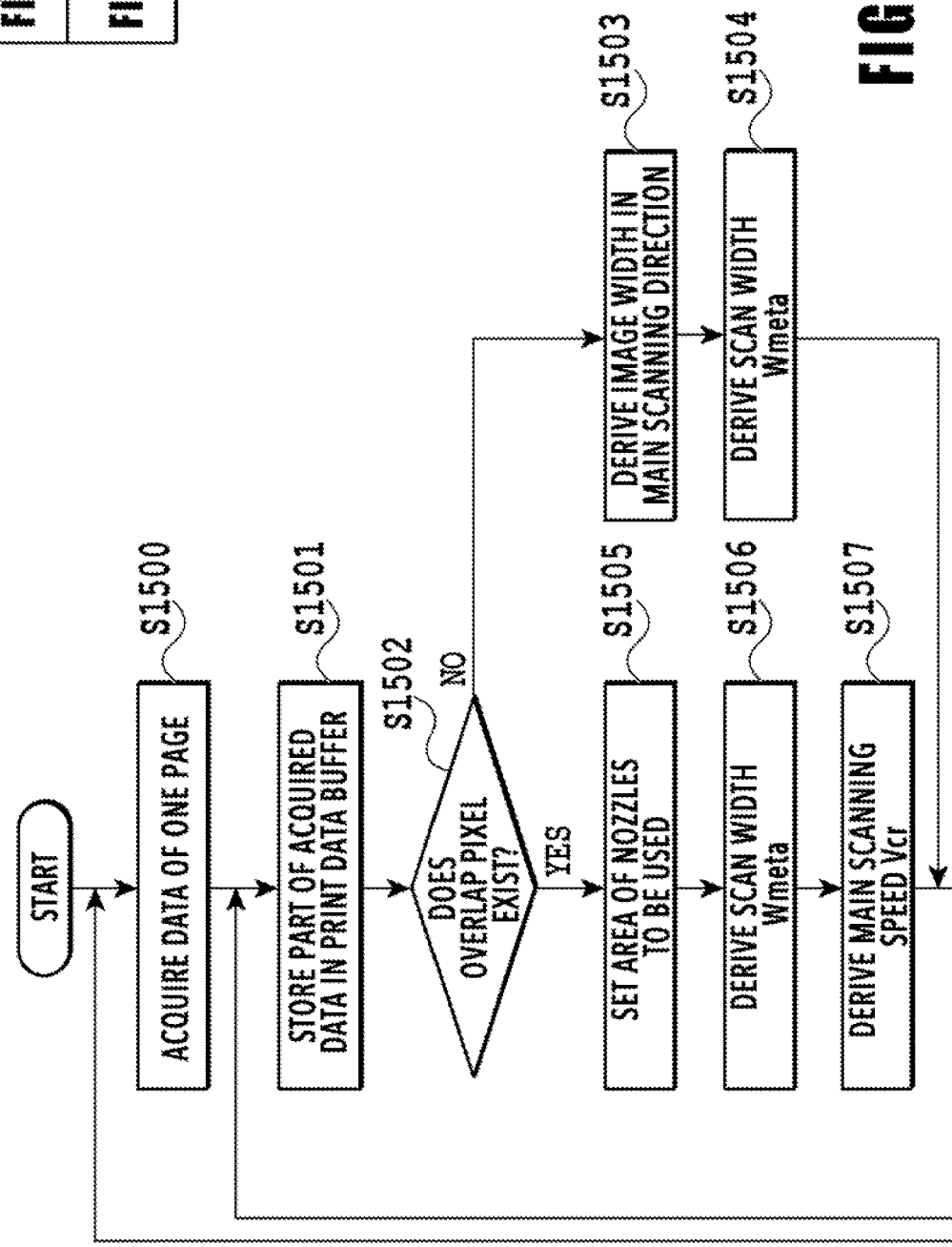

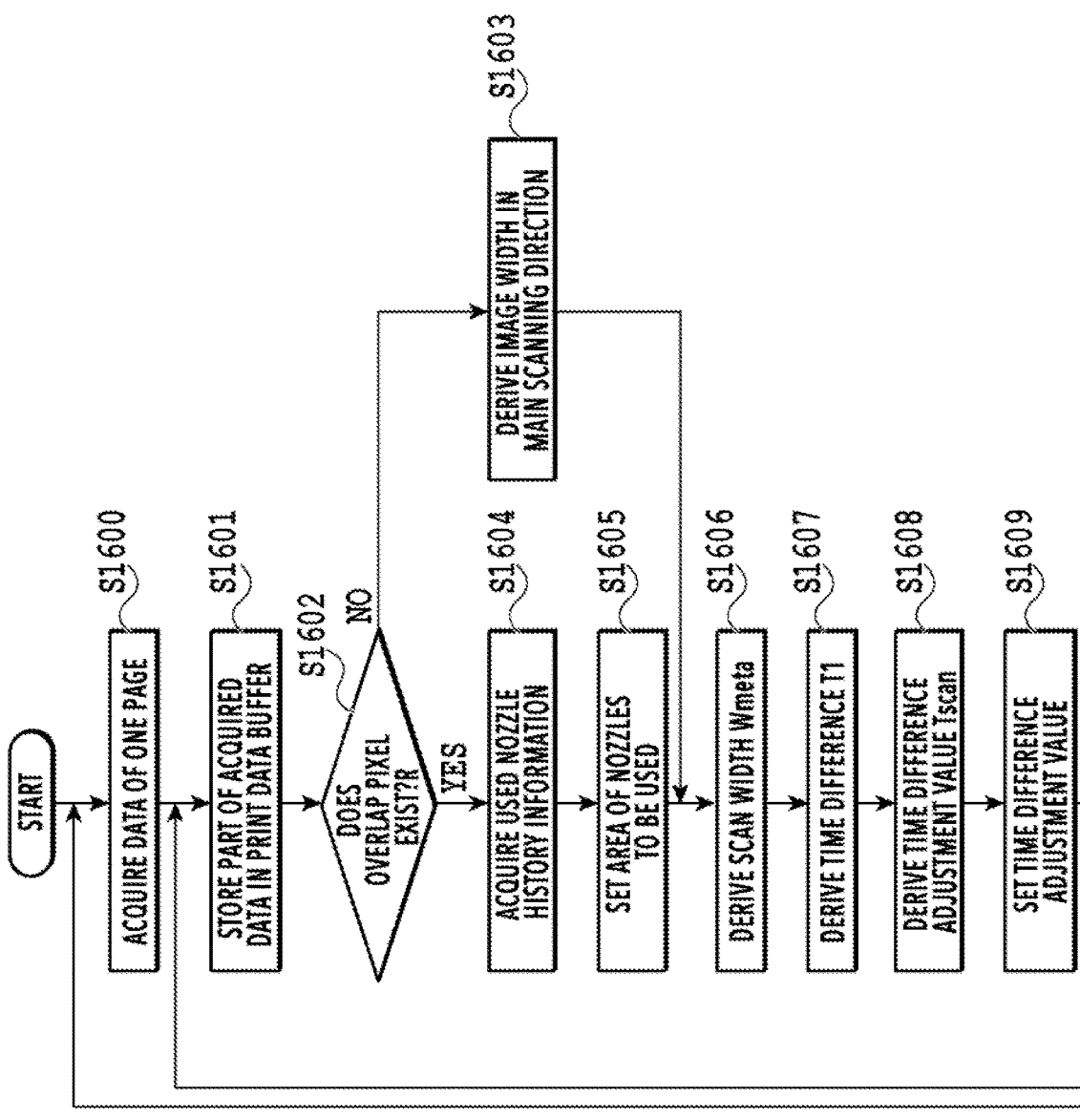

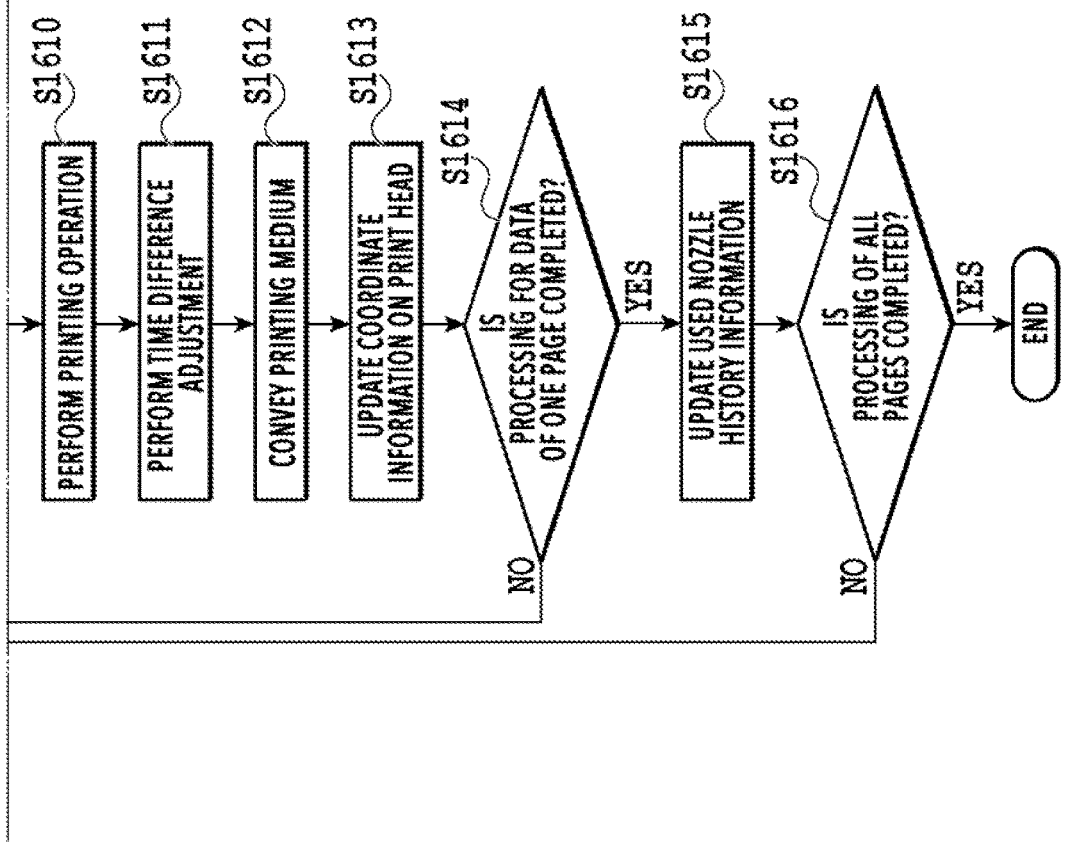

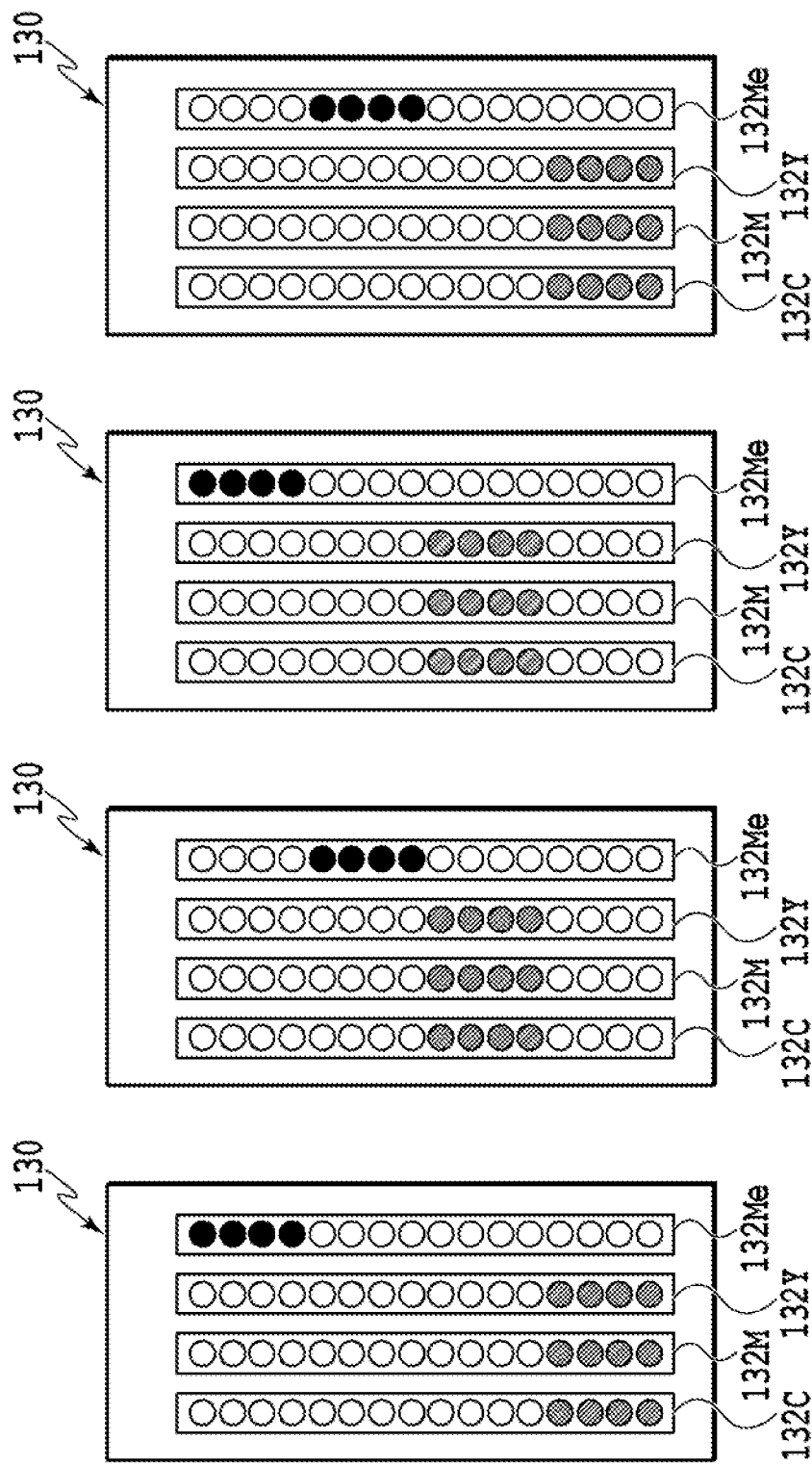

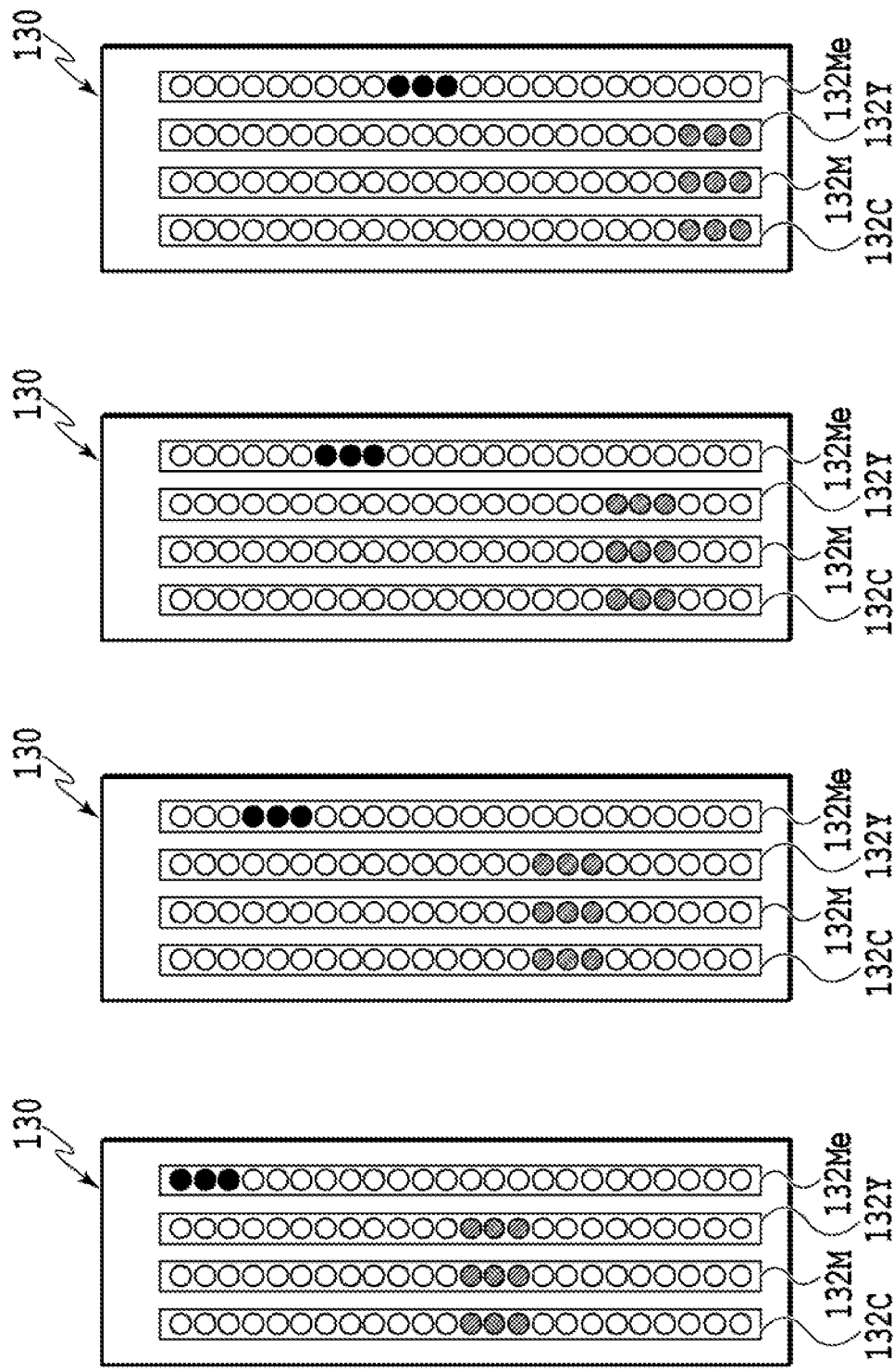

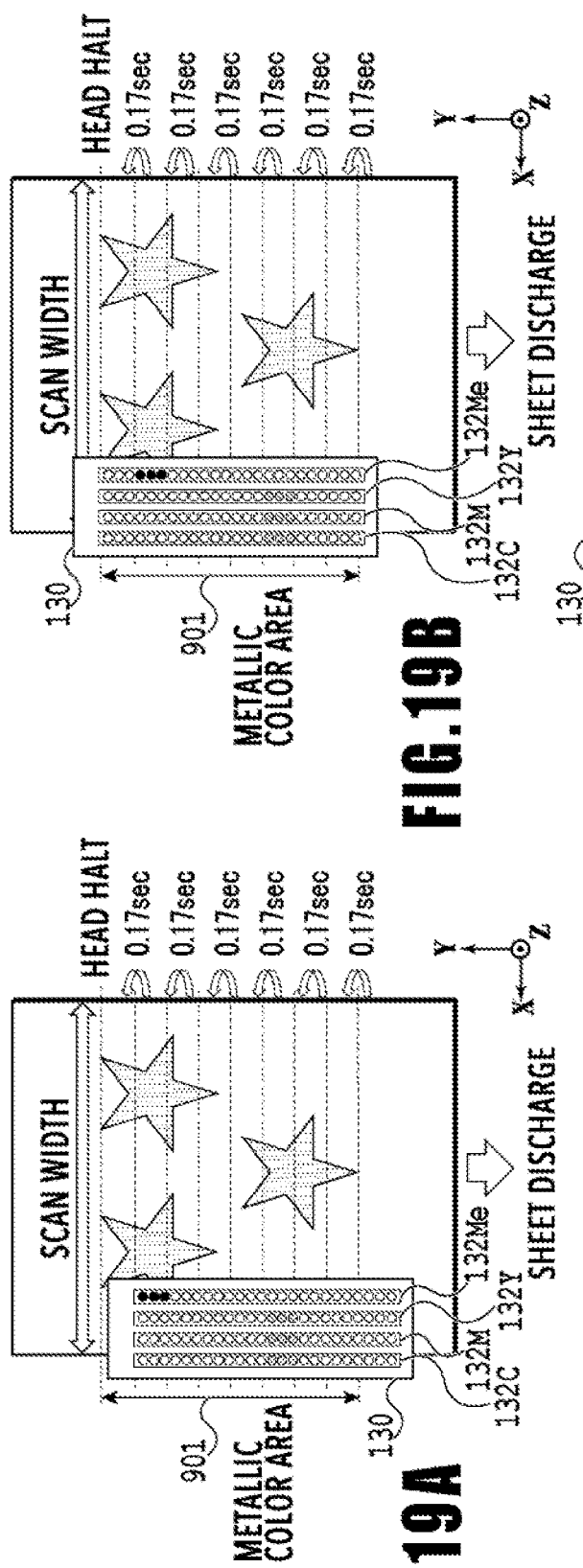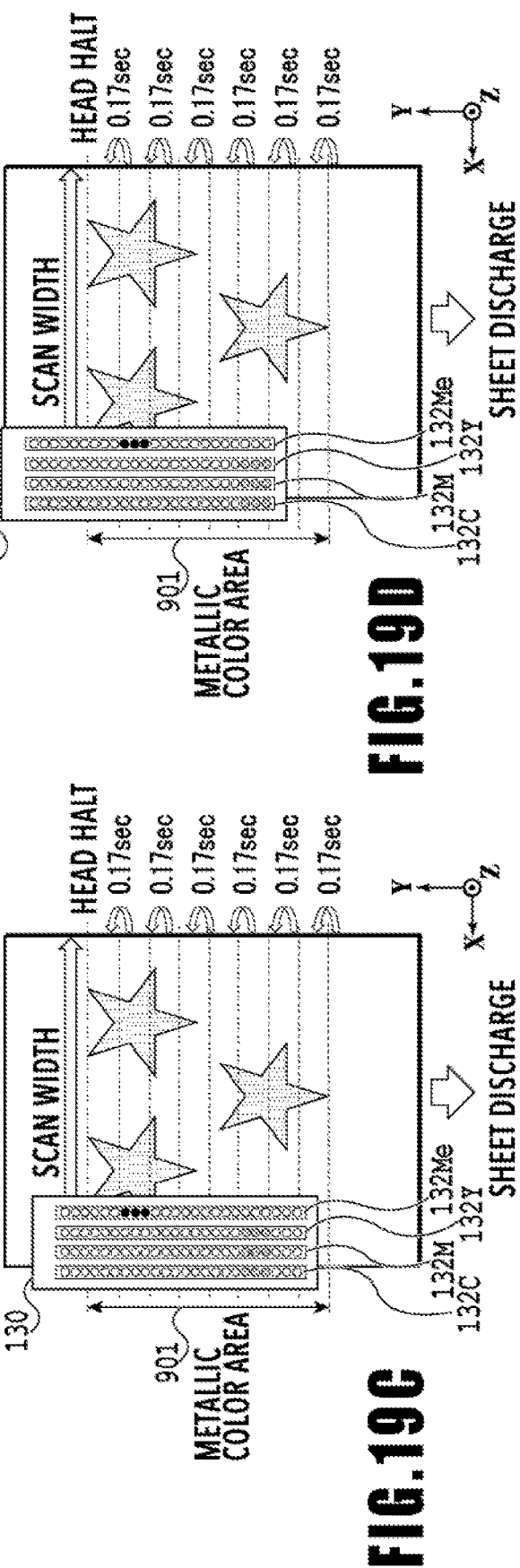

PRINTING APPARATUS, CONTROL METHOD THEREOF AND STORAGE MEDIUM

BACKGROUND OF THE INVENTION

Field of the Invention

The present invention relates to an printing apparatus, a control method thereof, and a storage medium.

Description of the Related Art

In recent years, a metallic ink containing metal particles and which can be ejected to a printing medium by an ink jet printing apparatus has appeared. In printing using a metallic ink, it is possible to apply metallic gloss to printed matter. As it is made possible to apply metallic gloss to printed matter, a request for a feeling of metallic gloss in an image is increasing. As one of such requests, there is a request to represent a color with metallic gloss by combining a conventional color ink and a metallic ink. Hereinafter, such a representation is called a "metallic color representation".

Japanese Patent Laid-Open No. 2016-55463 has disclosed a method of implementing a metallic color representation by applying a metallic ink as a backing onto a printing medium by ejecting the ink while moving the print head in the main scanning direction and by applying a color ink onto the backing. In Japanese Patent Laid-Open No. 2016-55463, an area in which any nozzle is not used (so-called blank nozzle area) is set at the time of shifting nozzles to be used in each nozzle row for a metallic ink nozzle row and a color ink nozzle row, in which a plurality of nozzles is arrayed along a sub scanning direction. By providing such an area, a sufficient time is obtained from application of the metallic ink as a backing until application of the color ink onto the backing. Due to this, it is possible to implement a high-quality color metallic representation because the color ink is applied after the metallic ink dries out sufficiently.

SUMMARY OF THE INVENTION

However, in a case where the printing element of a specific nozzle is kept being used by using the technique described in Japanese Patent Laid-Open No. 2016-55463, there occurs unevenness in the use frequency of the printing element. As a result of this, the life of the specific printing element that is kept being used ends earlier than that of a printing element that is not used, and therefore, the life of the print head is reduced.

Consequently, in view of the above-described problem, an object of the present invention is to attain both a high-quality metallic color representation and suppression of a reduction in the life of a printing element in an ink jet printing apparatus using a metallic ink, in addition to a color ink.

The present invention is a printing apparatus including: a conveyance unit configured to convey a printing medium in a first direction; a printing unit including a metallic row in which a plurality of printing elements applying a metallic ink including metal particles is arrayed along the first direction and a color row in which a plurality of printing elements applying a color ink including a color material is arrayed along the first direction; a scan unit configured to cause the printing unit to scan a plurality of times in a second direction intersecting with the first direction for a predetermined area on a printing medium; and a print control unit configured to control a printing operation so as to print a metallic color image by conveying a printing medium by the conveyance unit after applying the metallic ink to the predetermined area of the printing medium from a first element group included in the metallic row and by applying the color ink to the predetermined area from a second element group that is a printing element group included in the color row and which is located downstream of the first element group in the first direction, and the print control unit controls a time difference between application of the metallic ink to the predetermined area and application of the color ink thereto in accordance with a position of the first element group and a position of the second element group in the first direction so that a time difference from application of the metallic ink by the first element group to the predetermined area until application of the color ink by the second element group is longer than or equal to a predetermined time.

Further features of the present invention will become apparent from the following description of exemplary embodiments with reference to the applied drawings.

BRIEF DESCRIPTION OF THE DRAWINGS

FIG. 7A and FIG. 7B are each a flowchart of printing processing in the first embodiment;

FIG. 11A and FIG. 11B are each a flowchart of printing processing in a second embodiment;

FIG. 15A and FIG. 15B are each a flowchart of printing processing in a third embodiment;

FIG. 16A and FIG. 16B are each a flowchart of printing processing in a fourth embodiment;

FIG. 17A to FIG. 17D are each a diagram schematically showing an area of nozzles to be used in the fourth embodiment;

FIG. 18A to FIG. 18D are each a diagram schematically showing an area of nozzles to be used in a fifth embodiment; and FIG. 19A to FIG. 19D are each a diagram schematically showing a printing operation in the fifth embodiment.

DESCRIPTION OF THE EMBODIMENTS

In the following, with reference to the drawings, embodiments of the present invention are explained in detail. However, the following embodiments are not intended to limit the present invention and all combinations of features explained in the following embodiments are not necessarily indispensable to the solution of the present invention. Explanation is given by applying the same symbol to the same configuration. Further, the relative arrangement, the shapes, and the like of components described in the following are merely exemplary and not intended to limit the scope of the present invention only to those.

First Embodiment

<About Printing System>

Figure 1:
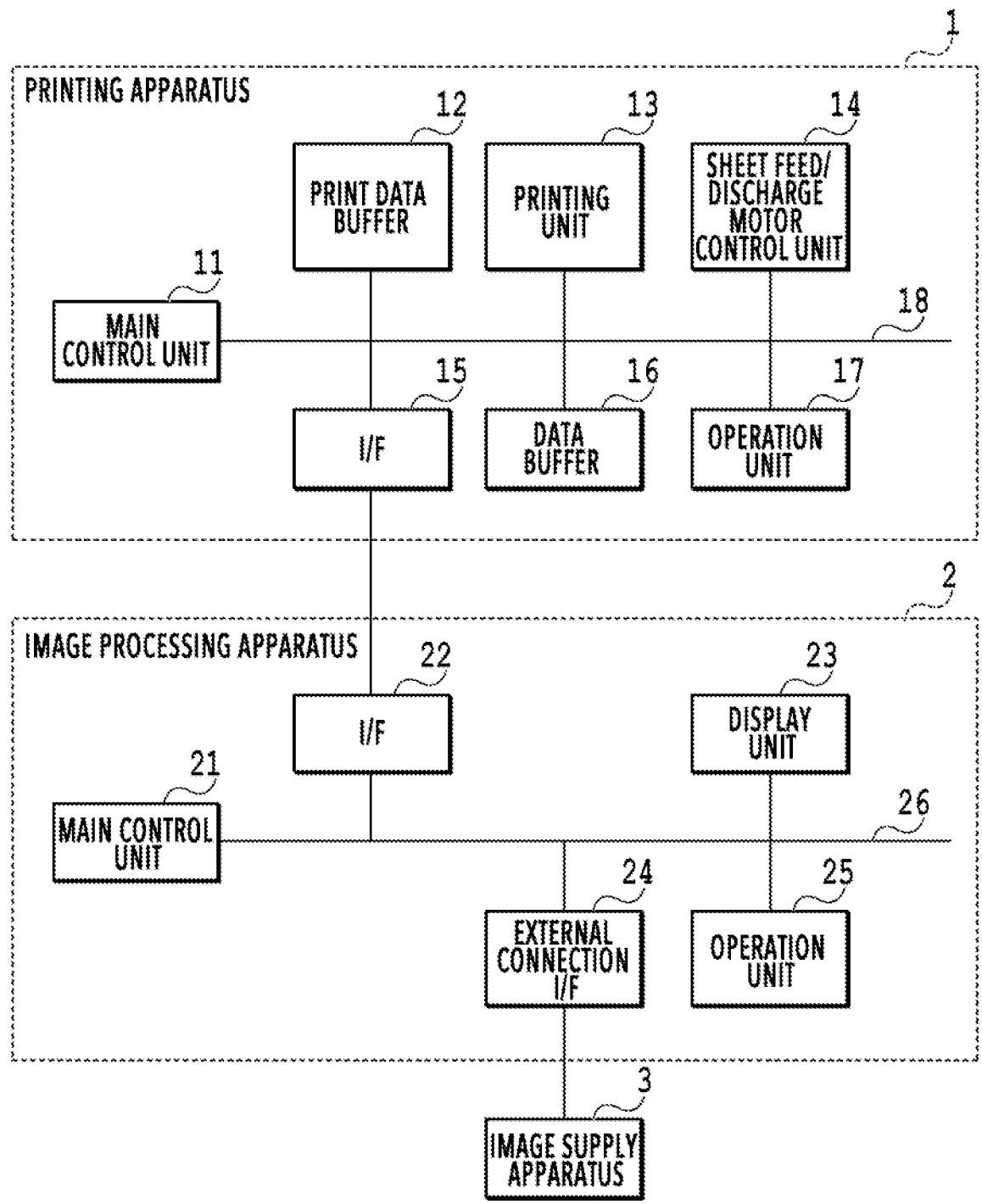
FIG. 1 is a block diagram showing a configuration of a printing system in a first embodiment.

In the following, the printing system in the present embodiment is explained by using FIG. 1. The printing system includes an ink jet printing apparatus (hereinafter, also referred to simply as printing apparatus) 1, an image processing apparatus 2, and an image supply apparatus 3. The image supply apparatus 3 supplies image data to the image processing apparatus 2. The image processing apparatus 2 creates print data by performing predetermined image processing for the image data supplied from the image supply apparatus 3 and transmits the created print data to the printing apparatus 1. The printing apparatus 1 prints an image on a printing medium by using ink based on the print data transmitted from the image processing apparatus 2.

A main control unit 11 of the printing apparatus 1 includes a CPU, a ROM, a RAM, and so on and centralizedly controls the entire printing apparatus 1. For example, the CPU of the main control unit 11 performs processing shown by a flowchart in FIG. 7A and FIG. 7B, to be described later. Print data that is transferred to a printing unit 13 is temporarily stored in a print data buffer 12 as raster data.

The printing unit 13 includes an ink jet print head and this print head has a plurality of nozzle arrays (printing element arrays) in which a plurality of nozzles including a printing element for ejecting ink drops is arranged side by side. The printing unit 13 prints an image on a printing medium by ejecting ink from each print nozzle based on the print data stored in the print data buffer 12. In the following, explanation is given by taking a case as an example where the print head has a total of four print nozzle arrays of three color inks of cyan (C), magenta (M), and yellow (Y), and a metallic (Me) ink.

<About Printing Unit of Printing Apparatus>

Figure 2:
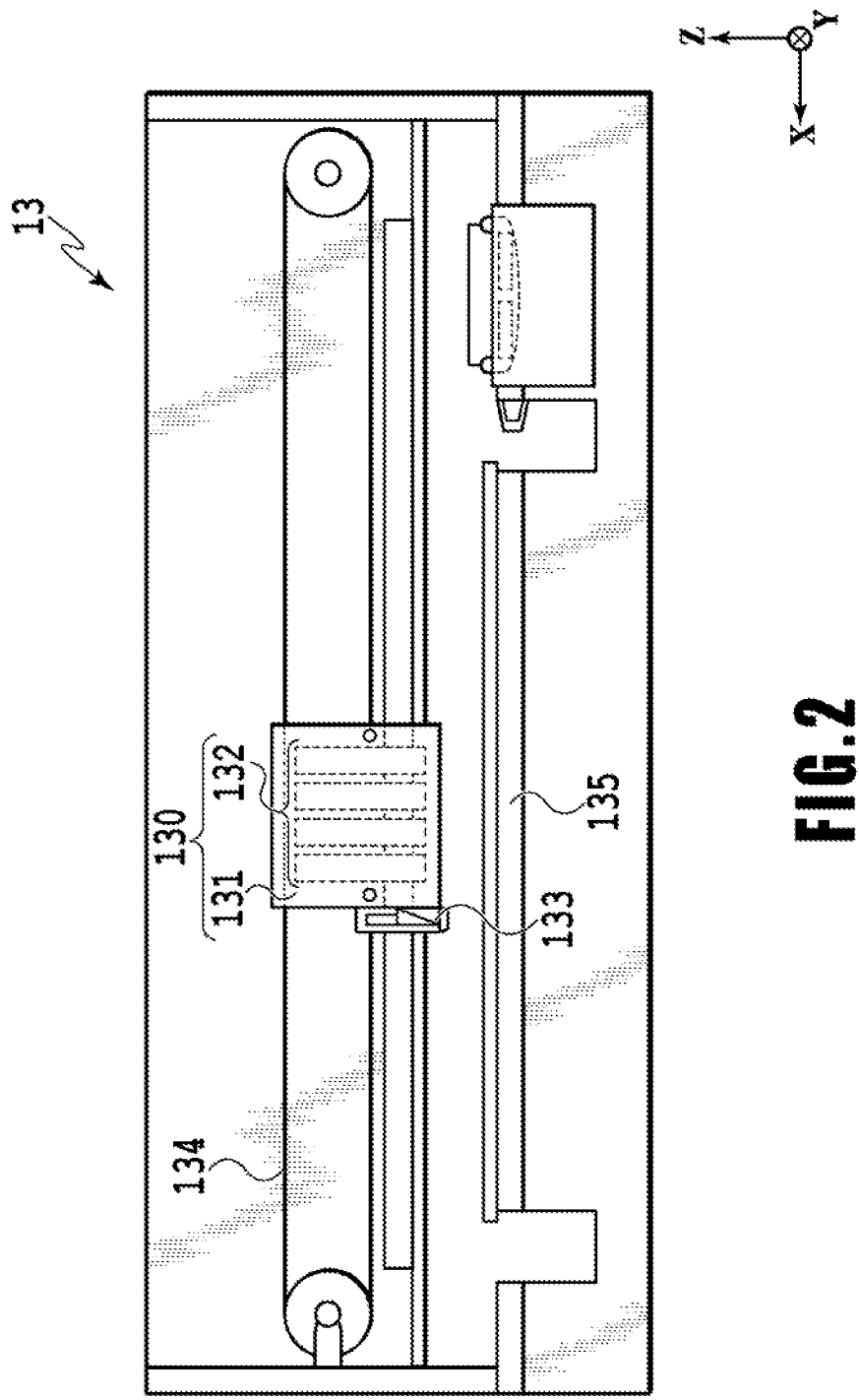
FIG. 2 is a diagram for explaining a configuration of a printing unit of an ink jet printing apparatus in the first embodiment.

FIG. 2 is a diagram for explaining a print head 130 configuring the printing unit 13 in the present embodiment. The print head 130 has a carriage 131, nozzle arrays 132, and an optical sensor 133. It is possible for the carriage 131 mounting the four nozzle arrays 132 and the optical sensor 133 to reciprocate along an X-direction in FIG. 2 (so-called main scanning direction) by a drive force of a carriage motor transmitted via a belt 134. While the carriage 131 is moving in the X-direction relatively with respect to the printing medium, ink is ejected from each nozzle of the nozzle arrays 132 in the direction of gravity (Z-axis minus direction in FIG. 2) based on print data. Due to this, on the printing medium arranged on a platen 135, an image corresponding to the one-time main scan is printed. In a case where the one-time main scan is completed, the printing medium is conveyed along the conveyance direction (in Y-axis minus direction in FIG. 2) by a distance corresponding to the width of the one-time main scan. By alternately repeating the main scan and the conveyance operation such as those, an image is formed gradually on the printing medium. The optical sensor 133 determines whether the printing medium exists on the platen 135 by performing the detection operation while moving together with the carriage 131.

<About Print Head>

Figure 3:
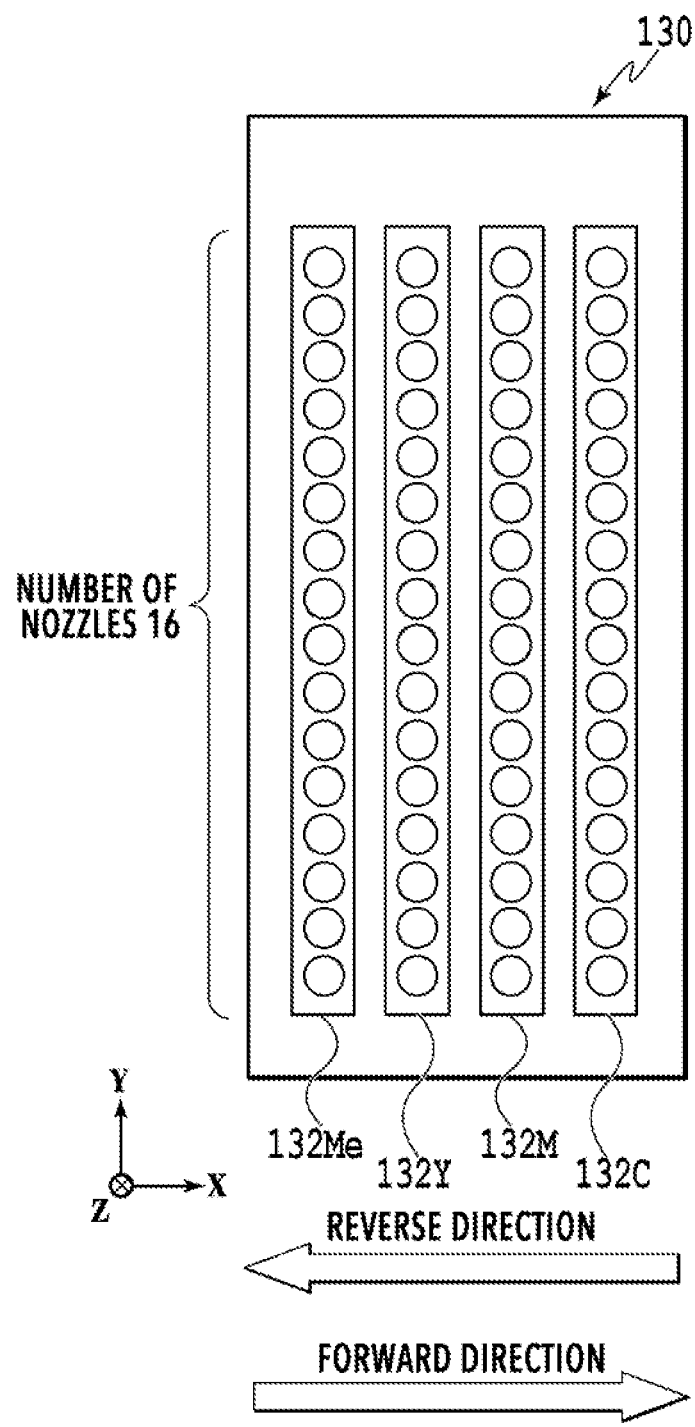
FIG. 3 is a diagram in a case where a print head in the first embodiment is viewed from a nozzle surface side (from lower side)

FIG. 3 is a diagram in a case where the print head 130 is viewed from the nozzle surface side (that is, from lower side). In the print head 130, four nozzle arrays, that is, a nozzle array 132C corresponding to the C ink, a nozzle array 132M corresponding to the M ink, a nozzle array 132Y corresponding to the Y ink, and a nozzle array 132Me corresponding to the Me ink are arranged so that the positions thereof in the X-direction are different. From the nozzle of the nozzle array 132C, the C ink is ejected, from the nozzle of the nozzle array 132M, the M ink is ejected, from the nozzle of the nozzle array 132Y, the Y ink is ejected, and from the nozzle of the nozzle array 132Me, the Me ink is ejected, respectively. In each nozzle array, a plurality of nozzles for ejecting ink as drops is arrayed at a predetermined pitch along the Y-direction. In a case of FIG. 3, it is assumed that 16 nozzles are arrayed in each nozzle array at a pitch of 1,200 dpi.

<About Image Data>

Figure 4:
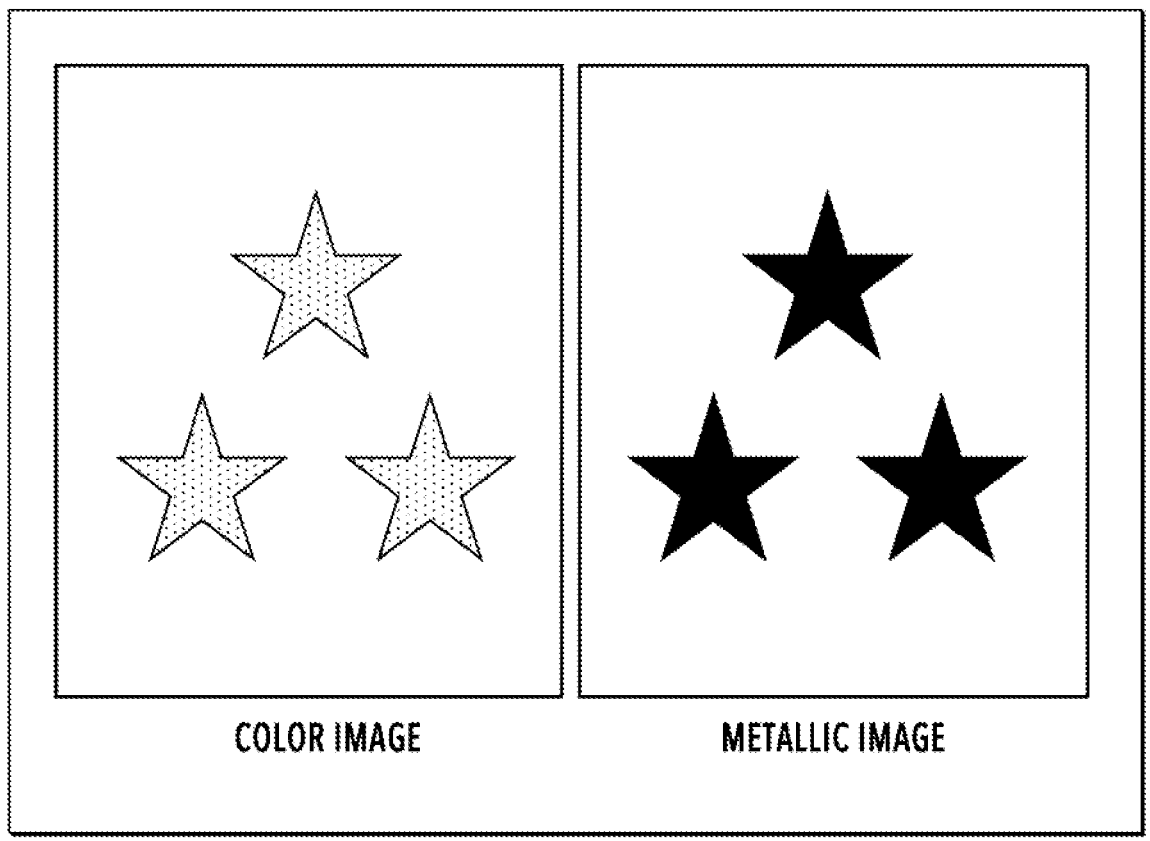
FIG. 4 is image data used in the first embodiment.

In the following, image data used in the present embodiment is explained by using FIG. 4. FIG. 4 is a diagram showing an example of image data that the image supply apparatus 3 transmits to the image processing apparatus 2.

In the present embodiment, the image processing apparatus 2 receives two kinds of image data from the image supply apparatus 3. Specifically, image data for the three color inks (called color image data) and image data for the metallic ink (called metallic image data) as shown in FIG. 4. The color image data is an image in which each pixel has values of a plurality of color components for representing a standardized color space, such as sRGB, and the metallic image data is a grayscale image whose size is the same as that of the color image. The areas in which the color image and the metallic image overlap (in a case of FIG. 4, three star-shaped areas) are areas represented as a metallic color. In the following, explanation is given on the assumption that the color image data is an image in which each pixel has values of three channels, specifically, an image in which each pixel has an 8-bit value for each of the RGB channels and the metallic image data is an image in which each pixel has an 8-bit value.

<About Print Data Creation Processing>

Figure 5:
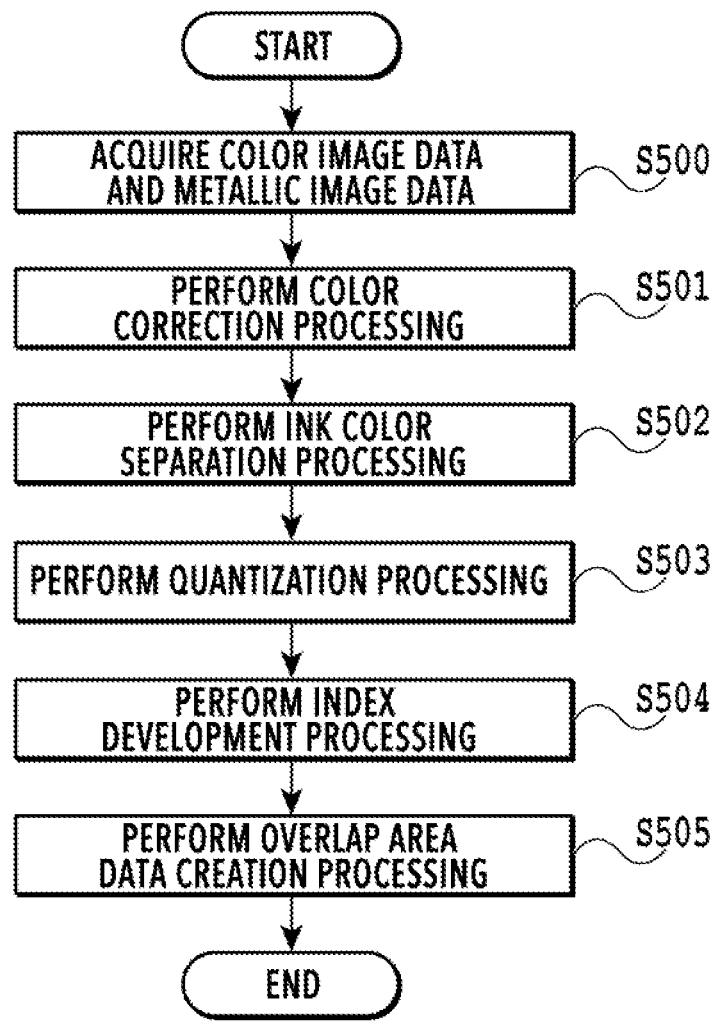
FIG. 5 is a flowchart of print data creation processing in the first embodiment.

In the following, processing to create print data (referred to as print data creation processing) based on image data, which is performed by a main control unit 21 of the image processing apparatus 2, is explained by using FIG. 5. A CPU mounted on the main control unit 21 of the image processing apparatus 2 loads a program stored in the ROM onto the RAM and executes the loaded program. Due to this, each piece of processing in FIG. 5 is performed.

At step S500, the main control unit 21 acquires the color image data and the metallic image data transmitted from the image supply apparatus 3. In the following, "step S - - -" is simply abbreviated to "S - - -".

At S501, the main control unit 21 performs processing (referred to as color correction processing) to convert the color image data acquired at S500 into image data in accordance with the color reproduction area of the printing apparatus 1. For example, by this step, the image data in which each pixel has an 8-bit value for each of the RGB channels is converted into image data in which each pixel has a 12-bit value for each of R'G'B' channels. For the conversion at this step, it may also be possible to use a publicly known method, such as the matrix arithmetic operation processing and a method of referring to a three-dimensional lookup table (hereinafter, 3DLUT) stored in advance in the ROM or the like. It is assumed that the printing apparatus 1 is compatible with an 8-bit grayscale image and the color correction processing at this step is not performed for the metallic image data acquired at S500.

At S502, the main control unit 21 performs processing (referred to as ink color separation processing) to separate the image data derived at S501 into image data for each ink. For example, by this step, the image data in which each pixel has a 12-bit value for each of the R'G'B' channels is separated into image data for each ink used in the printing apparatus 1 (that is, 16-bit gradation data of each of C, M, and Y). At this step also, as in the case with S501, it may also be possible to use a publicly known method, such as a method of referring to a three-dimensional lookup table (hereinafter, 3DLUT) stored in advance in the ROM or the like. Further, it is assumed that the printing apparatus 1 is compatible with an 8-bit grayscale image and the color separation processing at this step is not performed for the metallic image data acquired at S500.

At S503, by performing predetermined quantization processing for gradation data corresponding to each ink, the main control unit 21 converts the gradation data into quantized data of several bits. Specifically, the main control unit 21 converts the signal value of each ink into an ejection level specifying an ink ejection amount per unit area. For example, in a case of quantization into three values, the gradation data of each of C, M, Y, and Me is converted into 2-bit data in which each pixel has one of ejection levels 0 to 2 by this step.

At S504, the main control unit 21 performs index development processing based on the ejection level derived at S503. The index development processing is, for example, processing to develop one pixel in an image of 600 dpi×600 dpi into a bitmap pattern of 4×4 pixels in an image of 2,400 dpi×2,400 dpi. Specifically, a bitmap pattern is created by determining pixel values of 4×4 pixels in an image of 2,400 dpi×2,400 dpi based on the value of the ejection level of each ink color that each pixel has in an image of 600 dpi×600 dpi. It may also be possible to perform the processing at this step by using a publicly known method. For example, it may also be possible to store in advance the dot arrangement in accordance with ejection levels as tables and to determine the dot arrangement by using a table in accordance with the ejection level derived at S503. By this step, the final dot arrangement destination onto a sheet is determined and dot data corresponding to each ink of C (cyan), M (magenta), Y (yellow), and Me (metallic) is created. For example, in a case where it is possible for the print head 130 to arrange dots at a resolution of 2,400 dpi×2,400 dpi on a sheet surface, whether or not to arrange a dot at each of coordinates obtained by partitioning the sheet surface into grids of 2,400 dpi×2,400 dpi is determined.

At S505, processing (referred to as overlap area data creation processing) to create data indicating an area in which the color ink layer of at least one ink of the C, M, and Y color inks overlaps the layer of the Me ink is performed. Specifically, by using the dot data corresponding to the Me ink and the dot data corresponding to each color ink of C, M, and Y, all the pixels in which both a dot of the metallic ink and a dot of the color ink are arranged are found. By this step, overlap area data that is binary data (that is, the pixel in which both dots are arranged is indicated by 1 and the pixel in which both dots are not arranged is indicated by 0) is created.

The main control unit 21 creates a print job including the dot data corresponding to each ink created at S504 and the overlap area data created at S505. Then, the main control unit 21 transmits this print job to the printing apparatus 1 via an interface (abbreviated to I/F) 22.

Here, explanation is given on the assumption that each piece of processing in FIG. 5 is performed by the main control unit 21 of the image processing apparatus 2, but the present embodiment is not limited to the aspect such as this. Specifically, it may also be possible for the main control unit 11 of the printing apparatus 1 to perform all or part of the processing in FIG. 5. The above is the contents of the print data creation processing in the present embodiment.

<About Printing Operation>

Figure 6:
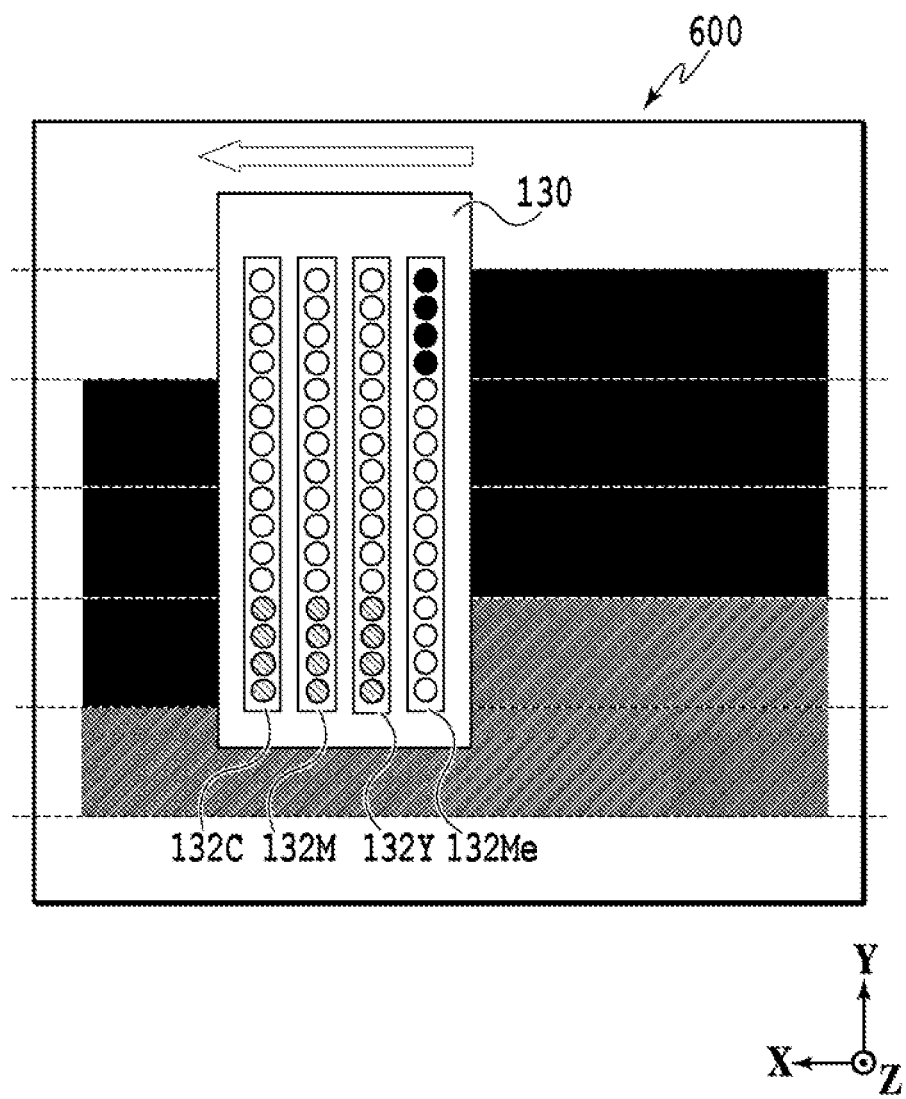
FIG. 6 is a diagram schematically showing arrangement of a print nozzle of each ink of the print head in the first embodiment and the way a printing operation is performed by using a print nozzle that actually ejects ink.

FIG. 6 is a diagram schematically showing the arrangement of the nozzle array of each ink in the print head 130 and the way the printing operation is performed by the nozzles actually ejecting ink. In the present embodiment, in order to implement a metallic color image, it is necessary to eject the color ink and the metallic ink onto the same area of the printing medium at different timings and it is necessary to take the timing into consideration. Specifically, it is necessary to control the ejection timing of the color ink and that of the metallic ink so that the metallic ink is applied first and then after providing a time difference longer than or equal to a predetermined value, the color ink is applied. In the present embodiment, the metallic ink and the color ink are applied in different scans. After the scan to apply the metallic ink, the printing medium is conveyed and the scan to apply the color ink is performed. Here, for simplification of explanation, a case where an image is formed by one path (forward path or reverse path) is explained as an example.

At the time of forming an image, the print head 130 is caused to eject each ink while being caused to scan along the main scanning direction. Then, in a case where the one-time main scan is completed, the printing medium is conveyed along the sub scanning direction. By repeating the main scan by the print head 130 and the conveyance operation of the printing medium such as those, an image is formed stepwise on the printing medium. The main scan and the conveyance operation are together called a "printing scan".

With the aspect of the image formation such as this in mind, in the present embodiment, it is assumed that the nozzles that actually eject ink of the nozzles included in the nozzle array 132Me in which the nozzles ejecting the metallic ink are arrayed along the sub scanning direction are the four nozzles at the front end indicated by solid black in FIG. 6 (referred to as first printing element group). Further, it is assumed that the nozzles that actually eject ink of the nozzles included in each of the nozzle arrays 132C, 132M, and 132Y corresponding to each color ink of C, M, and Y are the four nozzles at the rear end indicated by slashes (referred to as second printing element group). In each nozzle array, the nozzles existing at the front end side of the center are called conveyance-direction upstream side nozzles (also called simply upstream side nozzles). On the other hand, the nozzles existing at the rear end side of the center are called conveyance-direction downstream side nozzles (also called simply downstream side nozzles). As is known from FIG. 6, the nozzle group (first printing element group) ejecting the metallic ink are located on the conveyance-direction upstream side of the nozzle group (second printing element group) ejecting the color inks. In the present embodiment, by setting the conveyance amount of the printing medium to the amount corresponding to four nozzles, it is made possible to eject the color ink, after ejecting the metallic ink first to a predetermined area, to the same predetermined area with the conveyance of the printing medium being interposed in between.

In FIG. 6, a black-painted portion on a printing medium 600 represents an area printed by the metallic ink and a portion indicated by slashes represents an area printed by the color ink after the printing by the metallic ink. It is known that the two kinds of ink are applied onto the same area of the printing medium 600 at different timings by ejecting the color ink from the rear end nozzle after ejecting the metallic ink from the front end nozzle.

Further, in the present embodiment, as shown in FIG. 6, the eight nozzles existing between the nozzles (four nozzles at the front end) actually ejecting the metallic ink and the nozzles (four nozzles at the rear end) actually ejecting the color ink are controlled so as not to eject ink. The area such as this, in which neither metallic ink nor color ink is ejected, is called a "blank nozzle area". By providing the blank nozzle area, it is possible to apply the metallic ink and the color ink with a sufficient time difference longer than or equal to a predetermined time. In the case shown in FIG. 6, at least a time difference corresponding to three times of the main scan is provided between application of the metallic ink and application of the color ink. Due to this, it is possible to secure a sufficient time for the metallic ink applied onto the printing medium to dry. As a result of this, it is made possible to securely form a metallic ink layer and a color ink layer on the printing medium and to implement a metallic color representation excellent in glossiness and saturation.

In a case where the drying time of the metallic ink is insufficient, the color ink is applied before the layer of the metallic ink applied earlier is formed. In such a case, the metallic ink and the color ink mix with each other, or the color ink penetrates downward through the metallic ink, and therefore, it is no longer possible to implement a metallic color image excellent in glossiness and saturation. Consequently, in order to implement a metallic color image, the time difference between the timing of applying the metallic ink and the timing of applying the color ink is an important element.

In the present embodiment, the three color inks of cyan, magenta, and yellow are used and in many cases, the application time difference necessary between the metallic ink and each color ink is different depending on the kind of color ink, and therefore, it is desirable to set the application time difference in accordance with the color ink that needs the longest time difference. For example, it is known that the dye magenta ink is generally unlikely to cohere and it is unlikely that the magenta ink precipitates on the metallic ink layer. Consequently, in this example, by setting the number of nozzles to be used so as to secure the time difference necessary between the metallic ink and the magenta ink, it is made possible to implement a high-quality metallic color image in any combination of any color ink and the metallic ink.

The number of nozzles to be used and the conveyance amount are not limited to those described previously. As another example, a case is considered where the necessary time difference is shorter because the metallic ink is quick-drying. In this case, for example, it may also be possible to set the number of nozzles at the front end actually ejecting the metallic ink to six in the nozzle array of the metallic ink, and to set the number of nozzles at the rear end actually ejecting each color ink to six in the nozzle array of each color ink. At this time, by setting the conveyance amount of a printing medium to an amount corresponding to six nozzles, it is possible to improve productivity.

Further, as another example, a case is considered where the necessary time difference is longer because the metallic ink is slow-drying. In this case, for example, it may also be possible to set the number of nozzles at the front end actually ejecting the metallic ink to three in the nozzle array of the metallic ink, and to set the number of nozzles at the rear end actually ejecting each color ink to three in the nozzle array of each color ink. At this time, by setting the conveyance amount of a printing medium to an amount corresponding to three nozzles, it is made possible to make the time difference longer.

In addition, it may also be possible to set the number of nozzles at the front end actually ejecting the metallic ink to three in the nozzle array of the metallic ink, and to set the number of nozzles at the rear end actually ejecting each color ink to six in the nozzle array of each color ink. At this time, by setting the conveyance amount of a printing medium to an amount corresponding to three nozzles, it is possible to increase the number of times of the scan of the nozzle of the color ink capable of ejection and it is made possible to eject more color ink in the same area.

<About Printing Processing>

Next, the printing processing that enables application of the metallic ink and the color ink with a sufficient time difference, which is an important feature of the present embodiment, is explained. This printing processing includes processing for securing a time difference necessary between the timing of applying the metallic ink and the timing of applying the color ink. In the present embodiment, as described previously, the time difference is produced by selectively setting the nozzles to be used in each nozzle array, but there is a case where the time difference runs short depending on the position relationship of the nozzles to be used and the conveyance amount of a printing medium between the main scans. To deal with this case, the printing scan is controlled so as to compensate for the shortage of the necessary time difference by using another time difference setting unit.

Figure 7B:
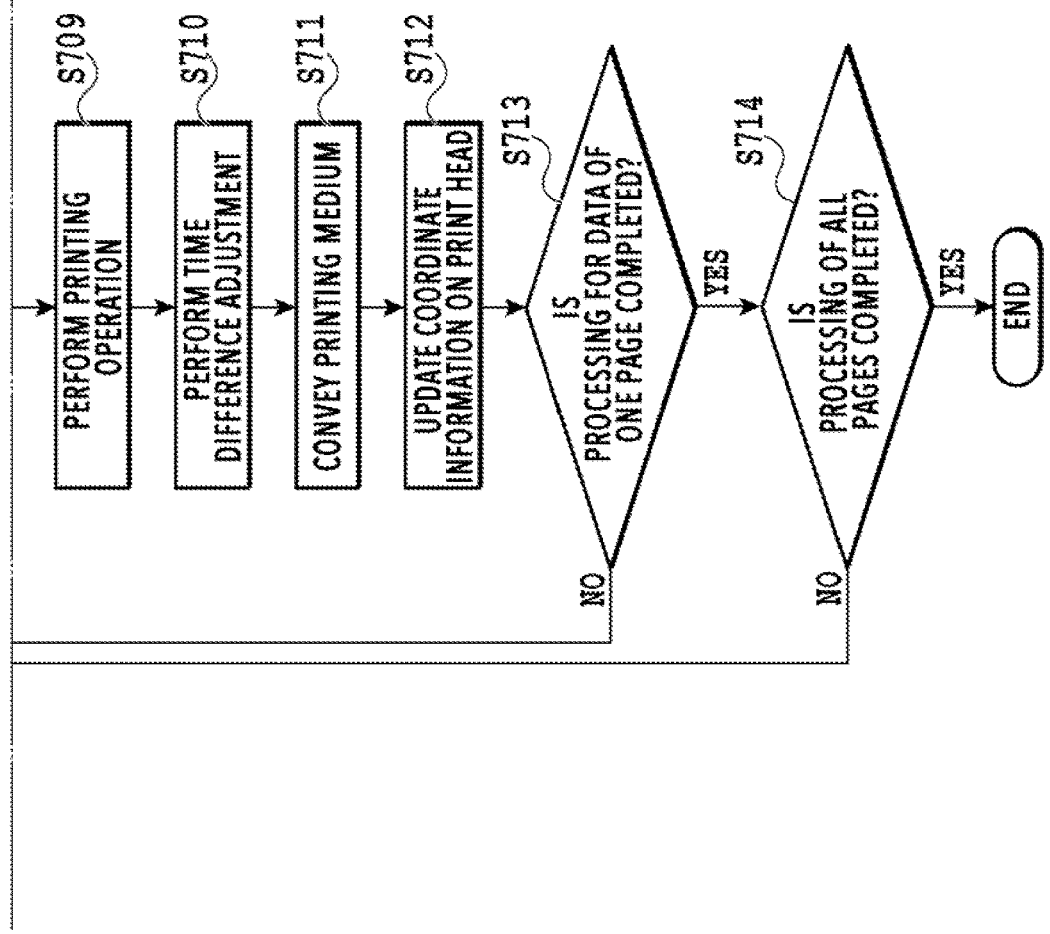

FIG. 7A and FIG. 7B are each a flowchart of the printing processing in the present embodiment. The CPU mounted on the main control unit 11 of the printing apparatus 1 loads a program stored in the ROM onto the RAM and executes the loaded program. Due to this, each piece of processing in FIG. 7A and FIG. 7B is performed.

Figures 8A, 8B:
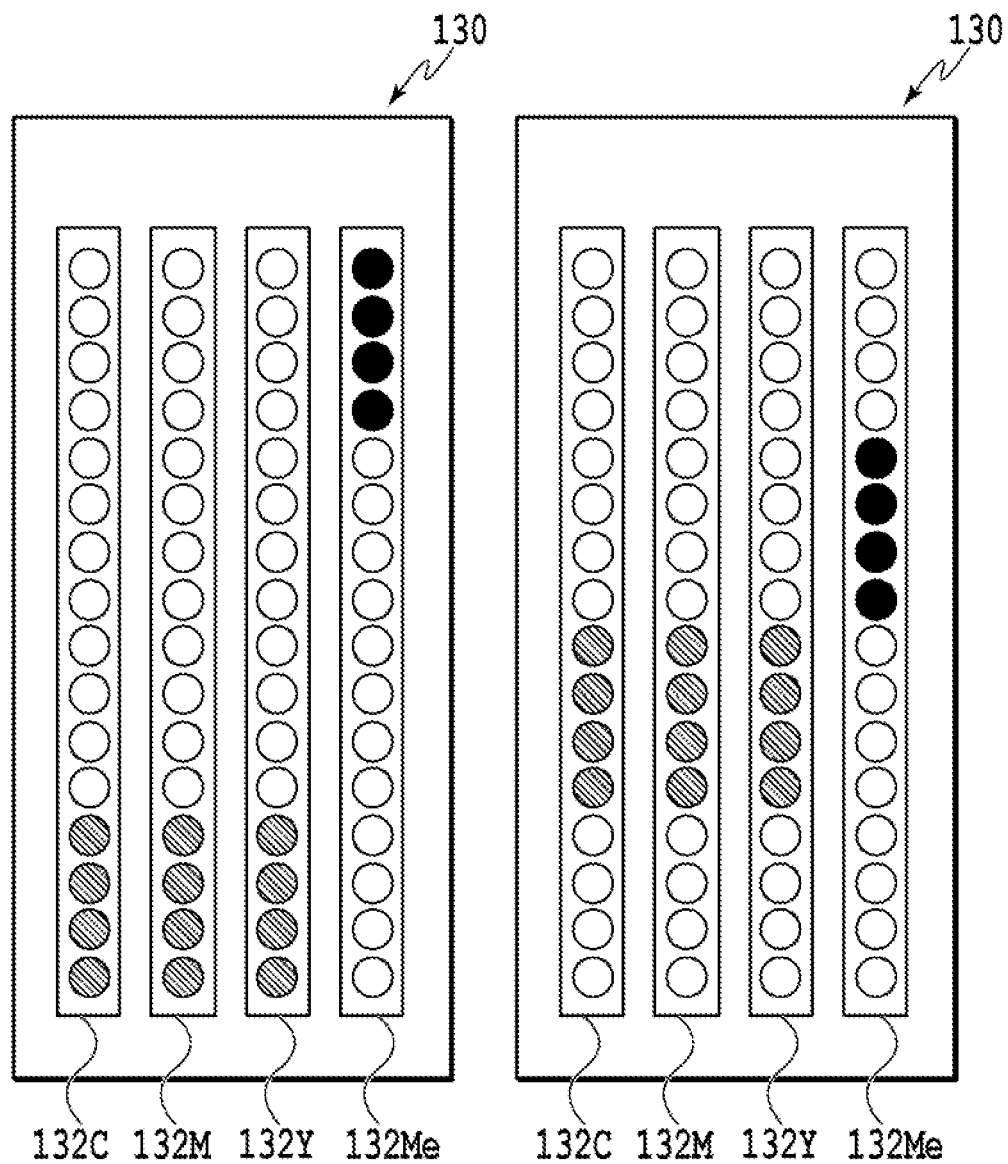
FIG. 8A and FIG. 8B are each a diagram schematically showing an area of nozzles to be used in the first embodiment.

Further, in the printing processing in the present embodiment, in order to suppress a reduction in the life of part of nozzles resulting from the frequency of use of specific nozzles becoming high and as a result of this, a reduction in the life of the print head, the area of nozzles to be used is changed for each print job. The print job is a print command set configured by data of one or a plurality of pages, whose setting relating to a printing medium and print quality is the same. The area of nozzles to be used is an area for setting nozzles actually ejecting ink and the nozzles included within the area of nozzles to be used actually eject ink. FIG. 8A and FIG. 8B are each a diagram schematically showing an example of a nozzle pattern indicating the area of nozzles to be used. In FIG. 8A and FIG. 8B, in the nozzle array 132Me, the nozzles actually ejecting ink are the four nozzles indicated by solid black and on the other hand, in the nozzle arrays 132C, the 132M, and 132Y, the nozzles actually ejecting ink are the four nozzles indicated by slashes.

Here, it is assumed that the printing processing is performed by using the nozzle pattern in FIG. 8A or FIG. 8B and further, as the printing-target image data, the metallic image data and the color image data shown in FIG. 4 are adopted. Here, the nozzle pattern is a pattern in the nozzle array including nozzles actually ejecting ink (referred to as ejection nozzles) and nozzles not ejecting ink (referred to as non-ejection nozzles). In the present embodiment, a plurality of kinds of nozzle pattern is held in advance and a nozzle pattern that is used is determined in according to the printing mode at the time of printing an image. The aspect may be an aspect different from that in which the information on the nozzles to be used and the nozzles not to be used is held as a nozzle pattern, and as long as the printing mode and the nozzles to be used are associated with each other, another aspect may be accepted. Further, in a data buffer 16 of the printing apparatus 1, information (referred to as time difference target value Tmeta) on the time difference between the timing of applying the metallic ink and the timing of applying the color ink, which should be secured in order to implement a high-quality metallic color image, is stored in advance. The time difference target value Tmeta is found by an experiment or the like.

At S700, the main control unit 11 acquires data of one page included in the print job stored in the data buffer 16. The data that is acquired at this step includes dot data corresponding to each ink and overlap area data.

At S701, the main control unit 11 stores part of the dot data corresponding to each ink and part of the overlap area data acquired at S700 in the print data buffer 12, respectively. The "part" means a total of two pieces of data, that is, data corresponding to the nozzles necessary for the one-time printing scan in which the print head 130 is caused to eject ink while being caused to scan along the main scanning direction, and data corresponding to the nozzles necessary for the next printing scan. In the present embodiment, as described previously, the printing processing is performed by using the pattern in FIG. 8A or FIG. 8B and even in a case where whatever the pattern is used, the number of nozzles to be used for the one-time printing scan is four. Consequently, at this step, the data corresponding to eight nozzles is stored in the print data buffer 12 as the data for two times of the printing scan.

At S702, the main control unit 11 determines whether a pixel in which the metallic ink and one of the color inks (that is, one of C, M, and Y) overlap exists by using the overlap area data stored in the print data buffer 12 at S701. The processing at this step is performed only for the data corresponding to the nozzles performing ejection in the first one-time printing scan of the overlap area data, which is binary data indicating whether or not there is an overlap. In a case where determination results at this step are negative, the processing advances to S703. On the other hand, in a case where the determination results are affirmative, the processing advances to S704.

At S703, the main control unit 11 acquires coordinate information on the left end and coordinate information on the right end in the main scanning direction by using the dot data of each ink and derives an image width in the main scanning direction based on the information. It may also be possible to perform the processing to derive an image width for the dot data corresponding to the nozzles performing ejection in two times of the printing scan. In this case, the area in which printing is performed by two times of the printing scan is taken into consideration, and therefore, productivity is improved.

At S704, the main control unit 11 sets the area of nozzles to be used in each nozzle array of the print head 130. In the present embodiment, two patterns are used alternately, such as that in the printing processing based on a first print job, the nozzles shown in FIG. 8A are used and in the printing processing based on a second print job, the nozzles shown in FIG. 8B are used. The setting of the area of nozzles to be used is performed by using a path mask or the like.

At S705, the main control unit 11 derives a width (referred to as scan width Wmeta) that the print head 130 is caused to scan. Specifically, a case is considered where a pixel in which the metallic ink and the color ink overlap does not exist (NO at S702) and coordinate information on dot data is acquired at S703. In this case, at the time of moving the print head 130 in the forward direction, it is possible to derive the scan width Wmeta based on the coordinate information on the right end of the dot data and on the other hand, at the time of moving the print head 130 in the reverse direction, it is possible to derive the scan width Wmeta based on the coordinate information on the left end. In contrast to this, in a case where a pixel in which the metallic ink and the color ink overlap exists (YES at S702), the same value as that in a case where there is dot data up to the maximum width in the main scanning direction for the printable area on a printing medium is derived as the scan width Wmeta.

At S706, the main control unit 11 derives a time difference (referred to as T1) between the timing of applying the metallic ink and the timing of applying the color ink, which is produced as the result of the area of nozzles to be used at S704 by using expression (1).

[Mathematical expression 1]

$$T1 = (W\text{meta}/Vcr) \times \{(N\text{blank}/N\text{scan}) + 1\} \quad \text{expression (1)}$$

Nscan is the number of nozzles to be used per printing scan in each nozzle array, Nblank is the number of nozzles within the blank nozzle area, and Vcr is the moving speed (so-called main scanning speed) in the main scanning direction of the print head 130 at the time of printing.

At S707, the main control unit 11 derives a value of time (referred to as time difference adjustment value Tscan) to be adjusted per printing scan for providing a predetermined time difference by expression (2) and expression (3) based on the time difference target value Tmeta and the time difference T1 derived at S706.

[Mathematical expression 2]

$$T2 = T\text{meta} - T1 \quad \text{expression (2)}$$

T2 is a value indicating an amount by which the time difference runs short only by the time difference T1 in order to provide a predetermined time difference.

[Mathematical expression 3]

$$T\text{scan} = T2 / \{(N\text{blank}/N\text{scan}) + 1\} \quad \text{expression (3)}$$

At S708, the main control unit 11 performs processing to further provide a time difference corresponding to the time difference adjustment value Tscan derived at S707. Specifically, the main control unit 11 sets the time difference adjustment value Tscan derived at S707 as a halt time of the print head 130 per printing scan.

At S709, the main control unit 11 causes the print head 130 to eject each ink by using the binary data of each ink stored in the print data buffer 12 at S701 while causing the print head 130 to scan along the main scanning direction. At this time, the main control unit 11 controls the print head 130 so as to scan the scan width Wmeta derived at S705 along the main scanning direction.

At S710, the main control unit 11 performs time difference adjustment by the time difference adjustment value Tscan derived at S707. Specifically, the main control unit 11 provides a standby time of the time difference adjustment value and halts the print head.

At S711, the main control unit 11 instructs a sheet feed/discharge motor control unit 14 to convey a printing medium along the sub scanning direction by a predetermined conveyance amount. In the present embodiment, the predetermined conveyance amount is an amount corresponding to the number of nozzles (for example, four in a case of FIG. 6) ejecting ink in the one-time printing scan.

At S712, the main control unit 11 updates the coordinate information indicating the position of the print head 130 in the main scanning direction.

At S713, the main control unit 11 determines whether the processing at S701 to S712 corresponding to data of one page acquired at S700 is completed. In a case where determination results at S713 are affirmative, the processing advances to S714. On the other hand, in a case where the determination results are negative, the processing returns to S701.

At S714, the main control unit 11 determines whether the processing of all the pages included in the print job is completed. In a case where determination results at this step are affirmative, the series of processing is terminated. On the other hand, in a case where the determination result at this step are negative, the processing returns to S700 and data of the next one page is acquired.

In the present embodiment, as described previously, in a case where the printing processing is performed by using the pattern shown in FIG. 8A for a certain print job, for the next print job, the printing processing is performed by using the pattern shown in FIG. 8B. In the case described previously, the printing apparatus is performed by using the pattern shown in FIG. 8A, and therefore, in the printing processing of the next print job, the pattern shown in FIG. 8B is used. The above is the printing processing in the present embodiment.

Further, in the case described previously, at the time of setting the area of nozzles to be used, the two kinds of pattern shown in FIG. 8A and FIG. 8B are used alternately for each print job. However, the number of patterns to be made use of is not limited to two and it may possible to make use of an arbitrary number (three or more) of patterns. Further, in a case where the pattern is switched for each print job, it may be possible to switch the pattern randomly in place of alternately. Furthermore, the switching timing is not limited for each print job. It may also be possible to switch in units of pages included in the print job, or in units of images within a page. It is also possible to switch at timing of an elapse of a predetermined period of time or at timing at which the number of times of ejection of a nozzle reaches a predetermined value.

Further, in the case described previously, the entire necessary application time difference is not produced only by the setting of the area of nozzles to be used (S704) and the shortage is compensated for by using the time difference adjustment unit (that is, head halt) (S708, S710), but the present embodiment is not limited to the aspect such as this. For example, a case is considered where by using ink or a printing medium that reduces the time difference target value, it is made possible to produce the necessary application time difference only by setting the area of nozzles to be used. In this case, the adjustment by the time difference adjustment unit is no longer necessary. Alternatively, the same can be said in a case where the number of nozzles included in the nozzle array is large and the nozzle array has a sufficient length. In this case also, it is possible to produce the necessary application time difference only by setting the area of nozzles to be used because it is possible to increase the number of nozzles within the blank nozzle area or the like, and therefore, there is a possibility that the adjustment by the time difference adjustment unit is not necessary.

Further, in the case described previously, the method of forming an image by applying ink by the one-time scan (so-called single path method) is adopted, but it is also possible to apply the present embodiment to the method of forming an image by applying ink by a plurality of times of the scan (so-called multipath method).

Further, in the case described previously, the area of nozzles to be used of the metallic ink and the area of nozzles to be used of the color ink are set so that the ejection nozzles do not overlap (see FIG. 8A and FIG. 8B). "To prevent the ejection nozzles from overlapping" means to make different the position of the nozzle actually ejecting ink in the sub scanning direction between the nozzle array of the metallic ink and the nozzle array of the color ink. In order to obtain the effect of the present embodiment sufficiently, it is preferable to set the area of nozzles to be used so that the ejection nozzles do not overlap, but the present embodiment is not limited to the aspect such as this. Even in a case where the setting is performed so that part of nozzles overlap, as long as it is possible to implement a high-quality metallic color representation, there is no problem. It is preferable to adjust the nozzle that is arranged at the overlap portion so that the amount of ink to be applied is small, for example, to reduce the ejection amount of the nozzle.

SPECIFIC EXAMPLE OF THE PRESENT EMBODIMENT

Figure 9:
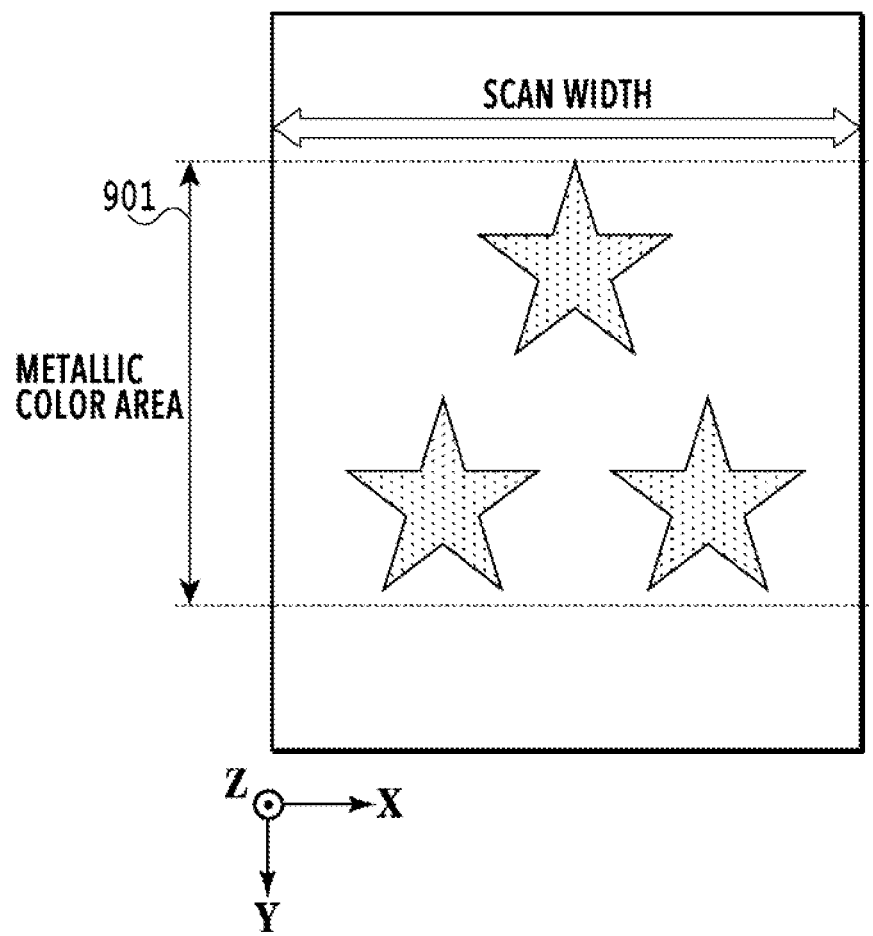
FIG. 9 is an image that is printed in the first embodiment.

In the following, the present embodiment is explained by taking a specific example. Here, a case is explained where the printing processing based on the first print job including data corresponding to the image of one page shown in FIG. 9 is performed and next, the printing processing based on the second print job including data corresponding to the same image as the image is performed.

As described previously, in this example, the two kinds of pattern shown in FIG. 8A and FIG. 8B are used alternately for each print job. Here, it is assumed that the pattern shown in FIG. 8A is used in the printing processing based on the first print job and the pattern shown in FIG. 8B is used in the printing processing based on the second print job. Further, the time difference target value Tmeta is taken to be 2.0 sec, the main scanning speed Vcr of the print head 130 is taken to be 635.0 mm/sec (=25.0 inch/sec), and the maximum value of the scan width in the main scanning direction of the print head 130 is taken to b 210.0 mm.

First, at S700, the main control unit 11 acquires data of one page included in the first print job stored in the data buffer 16.

At S701, the main control unit 11 stores part of the dot data corresponding to each ink and part of the overlap area data acquired at S700 in the print data buffer 12, respectively.

At S702, the main control unit 11 determines whether a pixel in which the metallic ink and one of the color inks (that is, one of C, M, and Y) overlap exists by using the overlap area data stored in the print data buffer 12 at S701. In this example, determination result at this step are affirmative and the processing advances to S704.

At S704, the main control unit 11 sets the area of nozzles to be used in each nozzle array of the print head 130. By this step, in the printing processing based on the first print job, the nozzles shown in FIG. 8A, that is, the four nozzles at the front end indicated by solid black are used in the nozzle array of the metallic ink, and the four nozzles at the rear end indicated by slashes are used in the nozzle array of the color ink.

At S705, the main control unit 11 derives the scan width Wmeta of the print head 130. In this example, a pixel in which the metallic ink and the color ink overlap exists (YES at S702). Consequently, the same value as that in a case where there is dot data up to the maximum width in the main scanning direction for the printable area on the printing medium is derived as the scan width Wmeta and Wmeta is derived as Wmeta=210.0.

At S706, the main control unit 11 derives the time difference T1 by using expression (1). In this example, Wmeta=210.0, Vcr=635 mm/sec, Nscan=4, and Nblank=8, and therefore, T1 derived as T1=(210.0/635.0)×{(8/4)+1}=0.99 sec.

At S707, the main control unit 11 derives the time difference adjustment value Tscan by using expression (2) and expression (3) based on the time difference target value Tmeta and the time difference T1. In this example, Tmeta=2.0 sec, T1=0.99 sec, and therefore, T2 is derived as T2=2.0−0.99=1.01 sec. Further, Nscan=4 and Nblank=8, and therefore, Tscan is derived Tscan=1.01/{(8/4)+1}=0.34 sec.

At S708, the main control unit 11 sets the time difference adjustment value Tscan (=0.34 sec) derived at S707 as a halt time of the print head 130 per printing scan.

At S709, the main control unit 11 causes the print head 130 to eject each ink by using the binary data of each ink stored in the print data buffer 12 at S701 while causing the print head 130 to scan along the main scanning direction. In this example, the main control unit 11 controls the print head 130 so as to scan the scan width Wmeta=210.0 mm along the main scanning direction.

At S710, the main control unit 11 performs time difference adjustment by the time difference adjustment value Tscan=0.34 sec set at S708, specifically, the main control unit 11 halts the print head for 0.34 sec.

At S711, the main control unit 11 instructs the sheet feed/discharge motor control unit 14 to convey a printing medium along the sub scanning direction. By this step, the printing medium is conveyed by a predetermined conveyance amount along the sub scanning direction. In this example, the predetermined conveyance amount is equal to the length corresponding to four nozzles arrayed along the sub scanning direction.

At S712, the main control unit 11 updates the coordinate information indicating the position of the print head 130 in the main scanning direction.

At S713, the main control unit 11 determines whether the processing at S701 to S712 corresponding to the data of one page acquired at S700 is completed. In a case where determination results at S713 are affirmative, the processing advances to S714. On the other hand, in a case where the determination results are negative, the processing returns to S701.

At S714, the main control unit 11 determines whether the processing of all the pages included in the print job is completed. In this example, by this step, in a case where the processing of one page included in the print job is completed, the printing processing based on the first print job is terminated.

Following the above, the printing processing based on the second print job is started. Each piece of processing at S700 to S702 for the second print job is the same as that for the first print job.

At S704, the main control unit 11 sets the area of nozzles to be used in each nozzle array of the print head 130. By this step, in the printing processing based on the second print job, the nozzles shown in FIG. 8B are used. In detail, in the nozzle array of the metallic ink, the four nozzles indicated by solid black, that is, the fifth to eighth nozzles from the front end are used, and in the nozzle array of the color ink, the four nozzles indicated by slashes, that is, the ninth to twelfth nozzles from the front end are used.

At S705, the main control unit 11 derives the scan width Wmeta of the print head 130. In this example, a pixel in which the metallic ink and the color ink overlap exists (YES at S702), and therefore, the scan width Wmeta is derived as scan width Wmeta=210.0 mm.

At S706, the main control unit 11 derives the time difference T1 by using expression (1). In this example, Wmeta=210.0 mm, Vcr=635 mm/sec, and Nscan=4 and as shown in FIG. 8B, Nblank=0, and therefore, T1 is derived as T1=(210.0/635.0)×{(0/4)+1}=0.33 sec. This is equal to the time taken for the one-time main scan.

At S707, the main control unit 11 derives the time difference adjustment value Tscan by using expression (2) and expression (3) based on the time difference target value Tmeta and the time difference T1. In this example, Tmeta=2.0 sec and T1=0.33 sec, and therefore, T2 is derived as T2=2.0−0.33=1.67 sec. Further, Nscan=4 and Nblank=0, and therefore, Tscan is derived as Tscan=1.67/{(0/4)+1}=1.67 sec.

At S708, the main control unit 11 sets the time difference adjustment value Tscan (=1.67 sec) derived at S707 as a halt time of the print head 130 per printing scan.

At S709, the main control unit 11 causes the print head 130 to eject each ink by using the binary data of each ink stored in the print data buffer 12 at S701 while causing the print head 130 to scan in the main scanning direction. In this example, the main control unit 11 controls the print head 130 so as to scan the scan width Wmeta=210.0 mm along the main scanning direction.

At S710, the main control unit 11 performs time difference adjustment by the time difference adjustment value Tscan=1.67 sec set at S708, specifically, the main control unit 11 halts the print head for 1.67 sec.

At S711, the main control unit 11 instructs the sheet feed/discharge motor control unit 14 to convey a printing medium along the sub scanning direction. By this step, the printing medium is conveyed by a predetermined conveyance amount along the sub scanning direction. In this example, the predetermined conveyance amount is equal to the length corresponding to four nozzles arrayed along the sub scanning direction. Each piece of processing at S712 to S714 that follow is the same as that for the first print job.

Figure 10A:
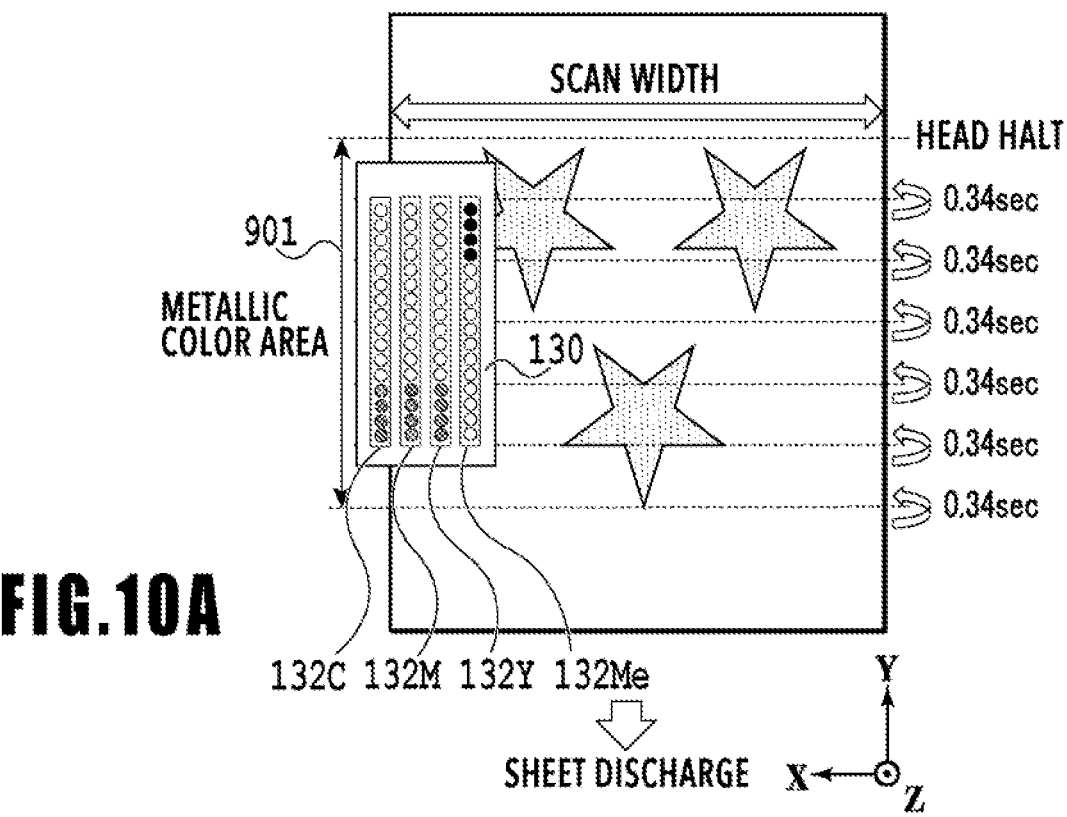
FIG. 10A and FIG. 10B are each a diagram schematically showing a printing operation in the first embodiment.
Figure 10B:
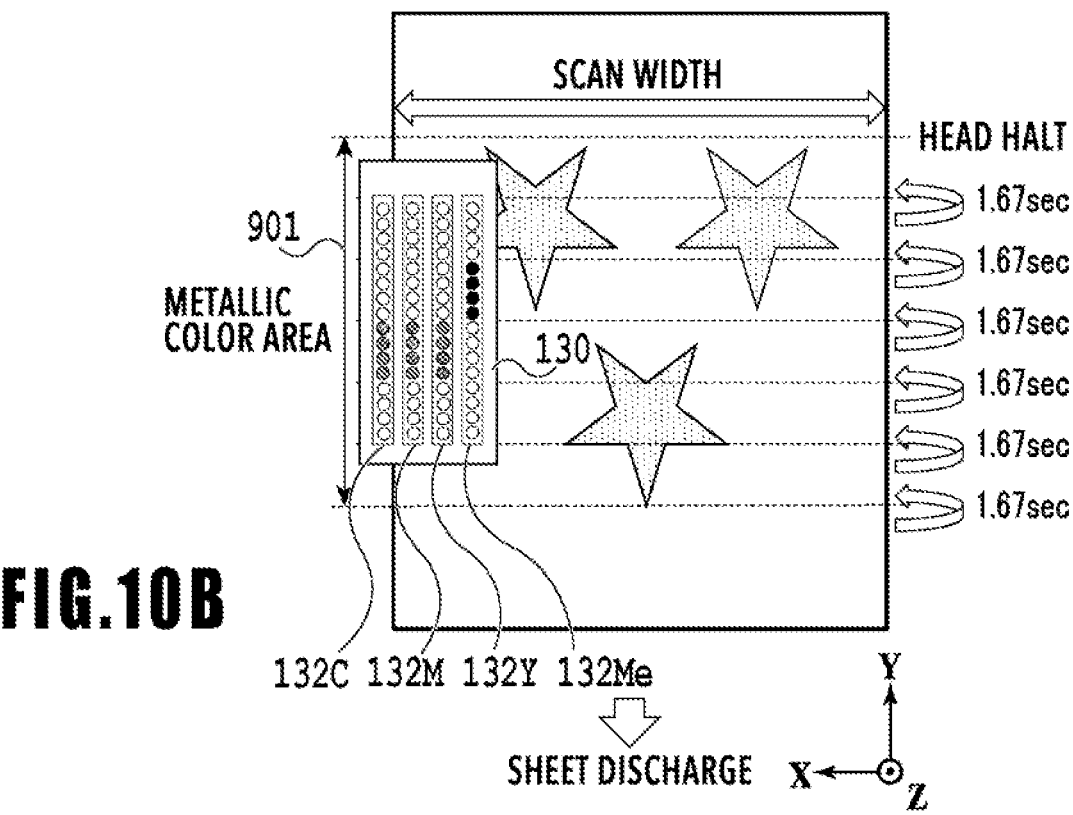

FIG. 10A and FIG. 10B are each a diagram schematically showing the printing operation according to the specific example described previously. FIG. 10A shows the first half of the specific example described previously, that is, the printing operation based on the first print job. A thick-line arrow in FIG. 10A indicates the length (scan width) scanned by the print head 130 at the time of performing printing in a metallic color area 901. As described previously, the scan width at this time is the same value as that in a case where there is dot data up to the maximum width in the main scanning direction for the printable area on the printing medium. In the printing processing for the first print job, the area of nozzles to be used is set as in FIG. 8A so that the number of blank nozzles provided between the nozzle to be used of the metallic ink and the nozzle to be used of the color ink (that is eight) is twice the number of nozzles to be used (that is four). Due to this, the time difference between application of the metallic ink and application of the color ink becomes longer than or equal to the time corresponding to at least three times of the main scan. Consequently, it is possible to produce about half of the time difference target value only by the setting of the area of nozzles to be used, and therefore, even in a case where the halt time for each printing scan is set to 0.34 sec, a somewhat short time, it is possible to secure 2.0 sec, which is the necessary time difference target value as a whole.

FIG. 10B shows the second half of the specific example described previously, that is, the printing operation based on the second print job. A thick-line arrow in FIG. 10B indicates the length (scan width) scanned by the print head 130 at the time of performing printing in the metallic color area 901. As described previously, the scan width at this time is the same value as that in a case where there is dot data up to the maximum width in the main scanning direction for the printable area on the printing medium. In the printing processing for the second print job, the area of nozzles to be used is set as in FIG. 8B and no blank nozzle area is provided between the nozzle to be used of the metallic ink and the nozzle to be used of the color ink. Consequently, it is not possible to produce almost all of the time difference target value only by the setting of the area of nozzles to be used. Because of this, by setting the halt time for each printing scan to 1.67 sec, a somewhat long time, 2.0 sec, which is the necessary time difference target value, is secured as a whole.

About Effect, Modification Example of the Present Embodiment

According to the present embodiment, even in a case where the area of nozzles to be used is changed for each print job, it is possible to perform control so that the time difference (also referred to as application time difference) between the timing of applying the metallic ink and the timing of applying the color ink becomes longer than or equal to a predetermined time difference target value. Consequently, it is possible to stably form a color ink layer on a metallic ink layer, and therefore, it is made possible to implement a high-quality metallic color representation. Further, by changing the area of nozzles to be used for each print job, it is possible to suppress a reduction in the life of the nozzle to be used compared to a case where the area of nozzles to be used is not changed (that is, a case where ejection is performed only by specific nozzles). As described above, by the present embodiment, it is made possible to attain both implementation of a high-quality metallic color representation and suppression of a reduction in the life of a nozzle to be used.

In the case described previously, on a condition that a pixel in which the metallic ink and the color ink overlap exists, the value of the scan width Wmeta is made the same as the value in a case where there is dot data up to the maximum width in the main scanning direction for the printable area on the printing medium (YES at S702→S705). However, the value of the scan width Wmeta in this case is not limited to the value described previously.

It may also be possible to set the value equal to the image width as the scan width Wmeta as in a case where a pixel in which the metallic ink and the color ink overlap does not exist, that is, as at the time of printing using one of the metallic ink and the color ink. However, in a case where a plurality of images exists within the same one page and the image width is different in different areas, there is a possibility that the necessary application time difference changes depending on the area and it is no longer possible to implement a high-quality metallic color representation. Because of this, in such a case, it is necessary to always secure a time difference longer than or equal to the time difference target value Tmeta by appropriately setting the time difference adjustment value Tscan, such as by setting a value larger than a value calculated by expression (3) as the time difference adjustment value Tscan per printing scan.

Further, in the case described previously, as the method of adjusting a time difference, the method is adopted in which the print head is temporarily halted between printing scans (S710), but the method is not limited to this and it may also be possible to adopt an arbitrary method in which a predetermined time difference is provided between printing scans. For example, it is possible to adopt a method of reducing the main scanning speed of the print head, or a method of reducing the conveyance speed of a printing medium. Alternatively, it may also be possible to use these methods in combination.

Second Embodiment

In the present embodiment, a nozzle pattern different from that of the first embodiment is used. Further, the present embodiment differs from the first embodiment in that the scan width of the print head 130 is changed in accordance with an image within the same page. In the following, the present embodiment is explained by taking a specific example. In the following, points different from the already-described embodiment are explained mainly and explanation of the same contents as those of the already-described embodiment is omitted appropriately.

Figure 11B:
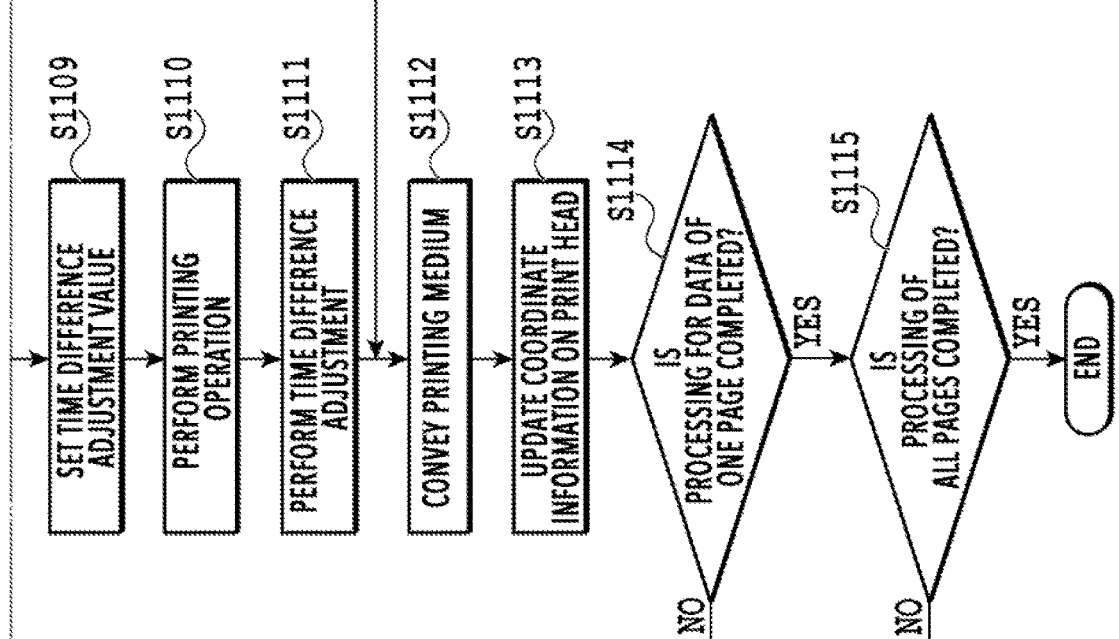

FIG. 11A and FIG. 11B are each a flowchart of the printing processing in the present embodiment. The CPU mounted on the main control unit 11 loads a program stored in the ROM onto the RAM and the CPU executes the loaded program. Due to this, each piece of processing in FIG. 11A and FIG. 11B is performed.

Figures 12A, 12B:
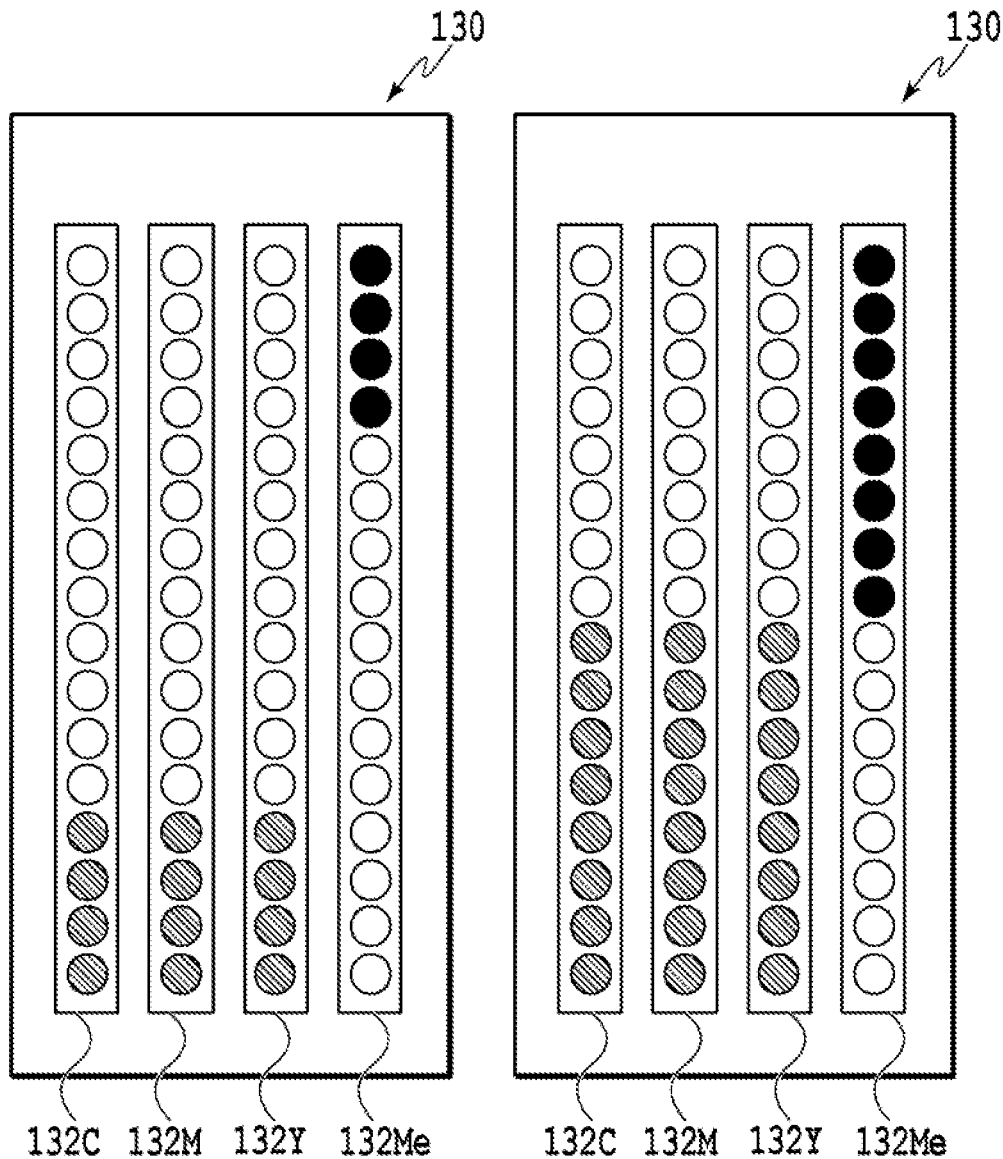
FIG. 12A and FIG. 12B are each a diagram schematically showing an area of nozzles to be used in the second embodiment.

In this example, two kinds of pattern shown in FIG. 12A and FIG. 12B are alternately used for each print job. Here, it is assumed that in the printing processing based on the first print job, the pattern shown in FIG. 12A is used and in the printing processing based on the second print job, the pattern shown in FIG. 12B is used. Further, the time difference target value Tmeta is taken to be 2.0 sec and the main scanning speed Vcr of the print head 130 is taken to be 635.0 mm/sec (=25.0 inch/sec).

First, at S1100, the main control unit 11 acquires data of one page included in the first print job stored in the data buffer 16.

At S1101, the main control unit 11 stores part of the dot data corresponding to each ink and part of the overlap area data acquired at S1100 in the print data buffer 12, respectively.

At S1102, the main control unit 11 acquires coordinate information on the left end in the main scanning direction and coordinate information on the right end by using the dot data of each ink, and derives an image width in the main scanning direction based on the acquired information. The processing to derive an image width is performed for the dot data corresponding to the nozzles performing ejection in two times of the printing scan. The present embodiment differs from the first embodiment and the processing at this step is performed without fail irrespective of the existence of a pixel in which the metallic ink and the color ink overlap (hereinafter, overlap pixel) (see FIG. 7A and FIG. 7B).

Figure 13:
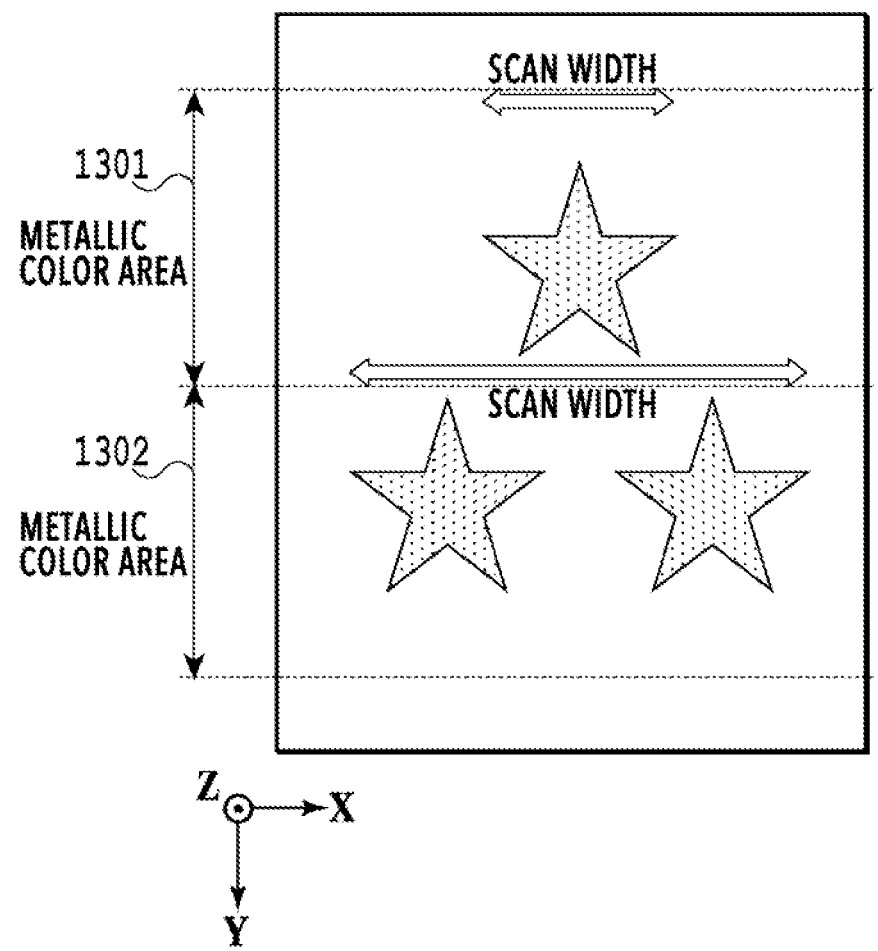
FIG. 13 is an image that is printed in the second embodiment.

At S1103, the main control unit 11 derives a distance (scan width) that the print head 130 is caused to scan along the main scanning direction by using the image width derived at S1102. The image width is different depending on the position in the sub scanning direction even though the images are within the same page, and therefore, the scan width for each area is derived, and in this point, the present embodiment differs from the first embodiment. For example, in a case of printing an image shown in FIG. 13, a scan width (referred to as Wmeta1) in a metallic color area 1301 and a scan width (referred to as Wmeta2) in a metallic color area 1302 are derived. Here, as an example, it is assumed that Wmeta1=60.0 mm and Wmeta2=140.0 mm.

At S1104, the main control unit 11 determines whether a pixel in which the metallic color and one of the color inks (that is, one of C, M, and Y) overlap exists by using the overlap area data stored in the print data buffer 12 at S1101. The processing at this step is the same as that at S702 of the first embodiment. In a case where determination results at this step are negative, the processing advances to S1105. On the other hand, in a case where the determination results are affirmative, the processing advances to S1106.

At S1105, the main control unit 11 causes the print head 130 to eject each ink by using the binary data of each ink stored in the print data buffer 12 at S1101 while causing the print head 130 to scan along the main scanning direction.

At S1106, the main control unit 11 sets the area of nozzles to be used in each nozzle array of the print head 130. By this step, in the printing processing based on the first print job, the nozzles shown in FIG. 12A, that is, the four nozzles at the front end indicated by solid black are used in the nozzle array of the metallic ink, and the four nozzles at the rear end indicated by slashes are used in the nozzle array of the color ink.

At S1107, the main control unit 11 derives a time difference (referred to as T11) in the metallic color area 1301 and a time difference (referred to as T12) in the metallic color area 1302 by using an expression similar to expression (1) based on the scan width derived at S1103. In this example, T11 is derived as T11=(Wmeta1/Vcr)×{(Nblank/Nscan)+1}=(60.0/635.0)×{(8/4)+1}=0.28 sec. Further, T12 is derived as T12=(Wmeta2/Vcr)×{(Nblank/Nscan)+1}=(140.0/635.0)×{(8/4)+1}=0.66 sec.

At S1108, the main control unit 11 derives a value of a time to be adjusted (time difference adjustment value) per printing scan for providing a predetermined time difference by using expressions similar to expressions (2) and (3).

Specifically, for the metallic color area 1301, T21 is derived as T21=Tmeta−T11=2.0−0.28=1.72 sec and Tscan1 is derived as Tscan1=T21/{(Nblank/Nscan)+1}=1.72/{(8/4)+1}=0.57 sec. Here, T21 is a value indicating an amount by which the time difference runs short only by the time difference T11 in order to provide a predetermined time difference in the metallic color area 1301 and Tscan1 is a time difference adjustment value in the metallic color area 1301.

Further, for the metallic color area 1302, T22 is derived as T22=Tmeta−T12=2.0−0.66=1.34 sec and Tscan2 is derived as Tscan2=T22/{(Nblank/Nscan)+1}=1.34/{(8/4)+1}=0.45 sec. Here, T22 is a value indicating an amount by which the time difference runs short only by the time difference T12 in order to provide a predetermined time difference in the metallic color area 1302 and Tscan2 is a time difference adjustment value in the metallic color area 1302.

At S1109, the main control unit 11 sets the time difference adjustment value derived at S1108 as a halt time of the print head 130 per printing scan. Specifically, the halt time in the metallic color area 1301 is set as Tscan1=0.57 sec and the halt time in the metallic color area 1302 is set as Tscan2=0.45 sec.

At S1110, the main control unit 11 causes the print head 130 to eject each ink by using the binary data of each ink stored in the print data buffer 12 at S1101 while causing the print head 130 to scan along the main scanning direction. In this example, at this step, in the metallic color area 1301, the print head 130 is controlled so as to scan the scan width Wmeta1=60.0 mm along the main scanning direction. Further, in the metallic color area 1302, the print head 130 is controlled so as to scan the scan width Wmeta2=140.0 mm along the main scanning direction.

At S1111, the main control unit 11 performs the time difference adjustment by the time difference adjustment value set at S1109. In this example, in the metallic color area 1301, the print head is halted for 0.57 sec and in the metallic color area 1302, the print head is halted for 0.45 sec.

At S1112, the main control unit 11 instructs the sheet feed/discharge motor control unit 14 to convey a printing medium along the sub scanning direction. By this step, the printing medium is conveyed by a predetermined conveyance amount along the sub scanning direction. In this example, the predetermined conveyance amount is equal to the length corresponding to four nozzles arrayed along the sub scanning direction.

At S1113, the main control unit 11 updates the coordinate information indicting the position of the print head 130 in the main scanning direction.

At S1114, the main control unit 11 determines whether the processing at S1101 to S1113 corresponding to the data of one page acquired at S1100 is completed. In a case where determination results at S1114 are affirmative, the processing advances to S1115. On the other hand, in a case where the determination results are negative, the processing returns to S1101.

At S1115, the main control unit 11 determines whether the processing of all the pages included in the print job is completed. In this example, by this step, in a case where the processing of one page included in the print job is completed, the printing processing based on the first print job is terminated.

Following the above, the printing processing based on the second print job is started. Each piece of processing at S1000 to S1104 for the second print job is the same as that for the first print job.

At S1106, the main control unit 11 sets the area of nozzles to be used in each nozzle array of the print head 130. By this step, in the printing processing based on the second print job, the nozzles shown in FIG. 12B, that is, in the nozzle array of the metallic ink, the eight nozzles at the front end indicated by solid black are used and in the nozzle array of the color ink, the eight nozzles at the rear end indicated by slashes are used.

At S1107, the main control unit 11 derives the time difference T11 in the metallic color area 1301 and the time difference T12 in the metallic color area 1302 by using an expression similar to expression (1) based on the scan width derived at S1103. In this example, T11 is derived as T11=(60.0/635.0)×{(0/4)+1}=0.094 sec and T12 is derived as T12=(140.0/635.0)×{(0/4)+1}=0.22 sec. As described above, the blank nozzle is not provided (see FIG. 12B), and therefore, the time required for the one-time main scan is the time difference as it is.

At S1108, the main control unit 11 derives the time difference adjustment value by using expressions similar to expressions (2) and (3). Specifically, for the metallic color area 1301, T21 is derived as T21=Tmeta−T11=2.0−0.094=1.906 sec and Tscan1 is derived as Tscan1=T21/{(Nblank/Nscan)+1}=1.906/{(0/4)+1}=1.906 sec. Further, for the metallic color area 1302, T22 is derived as T22=Tmeta−T12=2.0−0.22=1.78 sec and Tscan2 is derived as Tscan2=T22/{(Nblank/Nscan)+1}=1.78/{(0/4)+1}=1.78 sec.

At S1109, the main control unit 11 sets the time difference adjustment value derived at S1108 as a halt time of the print head 130 per printing scan. Specifically, the main control unit 11 sets the halt time in the metallic color area 1301 as Tscan1=1.906 sec and the halt time in the metallic color area 1302 as Tscan2=1.78 sec.

At S1110, the main control unit 11 causes the print head 130 to eject each ink by using the binary data of each ink stored in the print data buffer 12 at S1101 while causing the print head 130 to scan along the main scanning direction. In this example, at this step, in the metallic color area 1301, the print head 130 is controlled so as to scan the scan width Wmeta1=60.0 mm along the main scanning direction. Further, in the metallic color area 1302, the print head 130 is controlled so as to scan the scan width Wmeta2=140.0 mm along the main scanning direction.

At S1111, the main control unit 11 performs the time difference adjustment by the time difference adjustment value derived at S1108. In this example, in the metallic color area 1301, the print head is halted for 1.906 sec and in the metallic color area 1302, the print head is halted for 1.78 sec.

At S1112, the main control unit 11 instructs the sheet feed/discharge motor control unit 14 to convey a printing medium along the sub scanning direction. By this step, the printing medium is conveyed by a predetermined conveyance amount along the sub scanning direction. In this example, the predetermined conveyance amount is equal to the length corresponding to eight nozzles arrayed along the sub scanning direction.

Each piece of processing at S1113 to S1115 that follow is the same as that for the first print job.

Figure 14A:
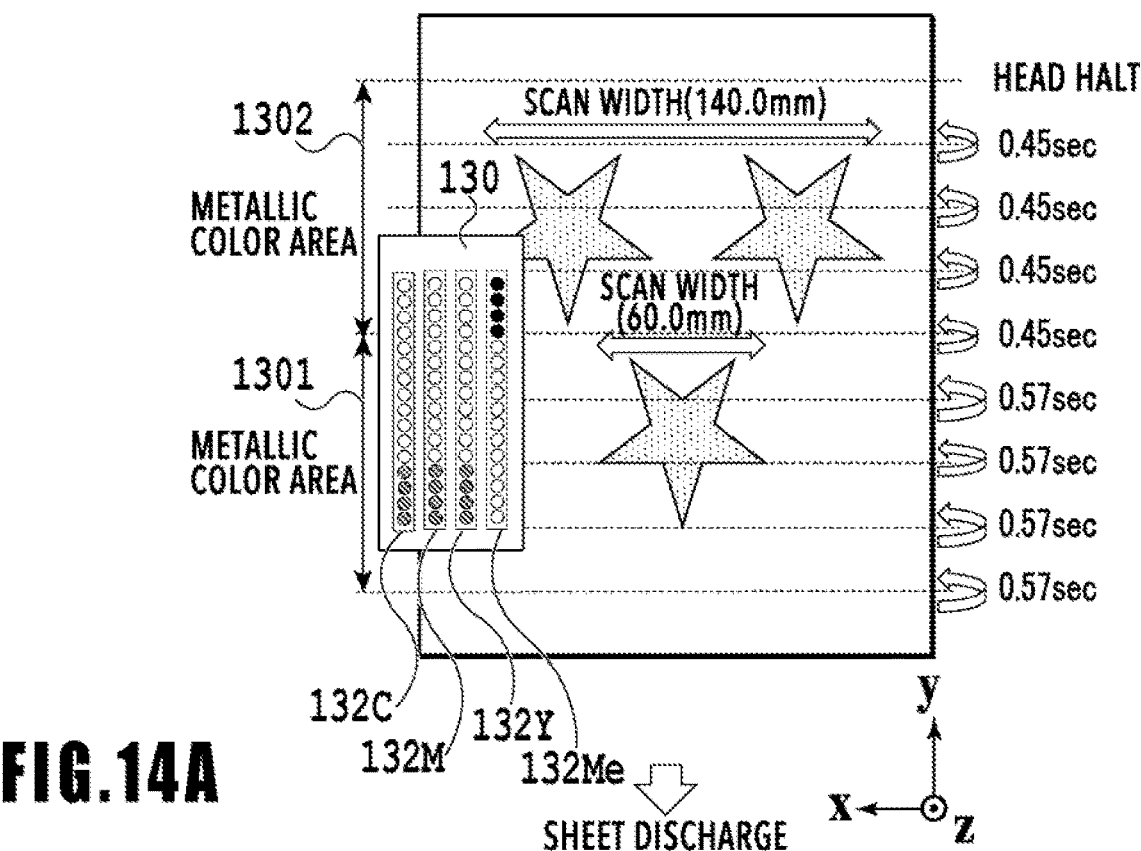
FIG. 14A and FIG. 14B are each a diagram schematically showing a printing operation in the second embodiment.
Figure 14B:
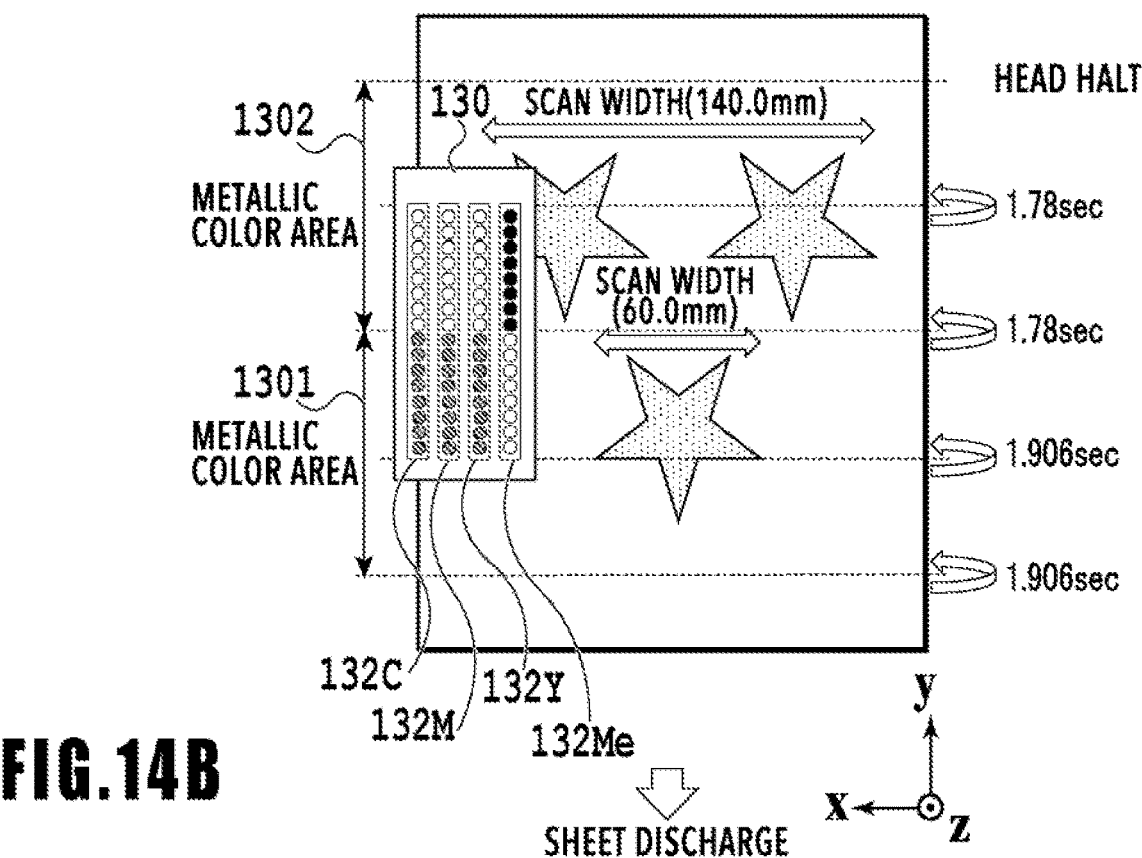

FIG. 14A and FIG. 14B are each a diagram schematically showing the printing operation in the present embodiment. FIG. 14A shows the first half of the printing processing described previously, that is, the printing operation based on the first print job. As shown schematically, in the upper metallic color area 1301, the print head 130 scans 60.0 mm, which is equal to the image width in the metallic color area 1301, along the main scanning direction. Further, in lower metallic color area 1302, the print head 130 scans 140.0 mm, which is equal to the image width in the metallic color area 1302, along the main scanning direction.

In the printing processing for the first print job, the area of nozzles to be used is set as in FIG. 12A so that the number of blank nozzles provided between the nozzle to be used of the metallic ink and the nozzle to be used of the color ink (that is eight) is twice the number of nozzles to be used (that is, four). Consequently, in the metallic color area 1301, the time difference between application of the metallic ink and application of the color ink corresponds to three times of the main scan performed by the print head 130 with the image width (60.0 mm) within the metallic color area 1301. Further, in the metallic color area 1302, this time difference corresponds to three times of the main scan performed by the print head 130 with the image width (140.0 mm) within the metallic color area 1302.

However, these time differences alone are not sufficient for the time difference target value necessary to implement a high-quality metallic color representation. Consequently, in the present embodiment, the halt time for each printing scan is set to 0.57 sec in the metallic color area 1301 and set to 0.45 sec in the metallic color area 1302. Due to this, both in the metallic color area 1301 and in the metallic color area 1302, the time difference between the timing of applying the metal ink and the timing of applying the color ink is the time difference target value (2.0 sec).

FIG. 14B shows the second half of the printing processing described previously, that is, the printing operation based on the second print job. As shown schematically, in the upper metallic color area 1301, the print head 130 scans 60.0 mm, which is equal to the image width in the metallic color area 1301, along the main scanning direction. Further, in the lower metallic color area 1302, the print head 130 scans 140.0 mm, which is equal to the image width in the metallic color area 1302, along the main scanning direction.

In the printing processing for the second print job, the area of nozzles to be used is set as in FIG. 12B and the blank nozzle area is not provided between the nozzle to be used of the metallic ink and the nozzle to be used of the color ink. Consequently, only by the setting of the area of nozzles to be used, it is not possible to produce almost all the time difference target value. Because of this, in the metallic color area 1301, the halt time for each printing scan is set to 1.906 sec and in the metallic color area 1302, the halt time is set to 1.78 sec. Due to this, both in the metallic color area 1301 and in the metallic color area 1302, the time difference between the timing of applying the metallic ink and the timing of applying the color ink is the time difference target value (2.0 sec).

About Effect of the Present Embodiment

By the present embodiment, it is made possible to attain both implementation of a high-quality metallic color representation and suppression of a reduction in the life of a nozzle to be used.

Third Embodiment

In the first embodiment, the time difference adjustment is performed by halting the print head. In contrast to this, in the present embodiment, the time difference adjustment is performed by reducing the main scanning speed of the print head. In the following, a specific example of the present embodiment is explained by using FIG. 15A and FIG. 15B. Here, as in the specific example of the first embodiment, a case is explained where the printing processing based on the first print job including data corresponding to the image of one page is performed and next, the printing processing based on the second print job including the data corresponding to the same image as the image is performed.

Figure 15B:
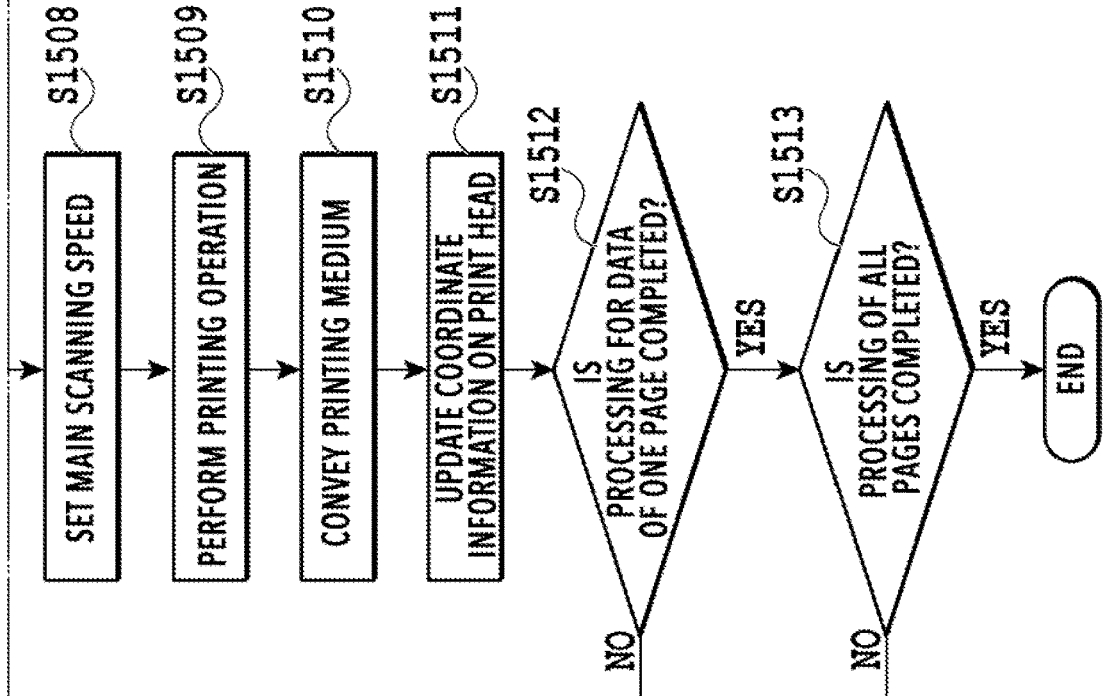

FIG. 15A and FIG. 15B are each a flowchart of the printing processing in the present embodiment. The CPU mounted on the main control unit 11 of the printing apparatus 1 loads a program stored in the ROM onto the RAM and executes the loaded program. Due to this, each piece of processing in FIG. 15A and FIG. 15B is performed.

In this example, the two kinds of pattern shown in FIG. 8A and FIG. 8B are used alternately for each print job. Here, it is assumed that in the printing processing based on the first print job, the pattern shown in FIG. 8A is used and in the printing processing based on the second print job, the pattern shown in FIG. 8B is used. Further, the time difference target value Tmeta is taken to be 2.0 sec, the initial value of the main scanning speed of the print head 130 is taken to be 635.0 mm/sec (=25.0 inch/sec), and the maximum value of the scan width in the main scanning direction of the print head 130 at the time of performing printing on a printing medium is taken to be 210.0 mm.

In this example, first, the printing processing for the first print job is performed. Each piece of processing at step S1500 to step S1502 is the same as each piece of processing at step S700 to step S702 in the first embodiment.

In a case where no overlap pixel exists (NO at S1502), at S1503, the main control unit 11 acquires the coordinate information on the left end in the main scanning direction and the coordinate information on the right end by using the dot data of each ink and derives an image width in the main scanning direction based on the acquired information. This step is the same as S703 in the first embodiment. At S1504, the main control unit 11 derives a distance the print head 130 is caused to scan (that is, scan width Wmeta). Specifically, in a case of performing the main scan by moving the print head 130 in the forward direction, the main control unit 11 derives the scan width Wmeta based on the coordinate information on the print head 130 and the coordinate information on the right end of the dot data. Further, in a case of performing the main scan by moving the print head 130 in the reverse direction, the main control unit 11 derives the scan width Wmeta based on the coordinate information on the print head 130 and the coordinate information on the left end of the dot data.

On the other hand, in a case where an overlap pixel exists (YES at S1502), at S1505, the main control unit 11 sets the area of nozzles to be used in each nozzle array of the print head 130. In this example, in the printing processing based on the first print job, the pattern shown in FIG. 8A is used.

At S1506, the main control unit 11 derives the scan width Wmeta of the print head 130. Specifically, the main control unit 11 derives 210.0 mm as the scan width Wmeta, which is the same value as that in a case where there is dot data up to the maximum width in the main scanning direction for the printable area on the printing medium.

At S1507, the main control unit 11 derives the main scanning speed Vcr of the print head 130 by using expression (4) based on the scan width Wmeta derived at S1506.

[Mathematical expression 4]

$$Vcr = (Wmeta/Tmeta) \times \{(Nblank/Nscan)+1\} \qquad \text{expression(4)}$$

In this example, the pattern shown in FIG. 8A is used, and therefore, Vcr is derived as Vcr=(210.0/2.0)×{(8/4)+1}=315.0 mm/sec (=12.4 inch/sec). Here, the case is shown where the main scanning speed is calculated by using a predetermined mathematical expression, but the method of deriving a main scanning speed is not limited to this. For example, it may also be possible to use such a method in which in a case where the scan width is a half of the maximum value, the main scanning speed is derived as a half of the value corresponding to the maximum value, and in a case where the scan width is a quarter of the maximum value, the main scanning speed is derived as a quarter of the value corresponding to the maximum value. Alternatively, it may also be possible to store in advance a table holding the main scanning speeds associated with the scan widths in the data buffer 16 and to derive the main scanning speed by using the table.

At S1508, the main control unit 11 sets the main scanning speed of the print head 130. In detail, in a case where an overlap pixel exists (YES at S1502), the main control unit 11 sets the main scanning speed to the value derived at S1507. On the other hand, in a case where no overlap pixel exists (NO at S1502), the main control unit 11 sets the main scanning speed to the initial value (635.0 mm/sec). In a case where the main scanning speed is changed from the initial value at this step, it is also necessary to adjust the timing of ejecting ink drops from the nozzle in accordance with the changed main scanning speed. For example, in a case where the main scanning speed is changed to a half of the initial value by this step, by ejecting ink drops at intervals twice the previous intervals, a deviation in the landing position of the ink drop is prevented from occurring before and after the main scanning speed is changed.

At S1509, the main control unit 11 causes the print head 130 to eject each ink by using the binary data of each ink stored in the print data buffer 12 at S1501 while causing the print head 130 to scan along the main scanning direction. In this example, an overlap pixel exists (YES at S1502→S1506), and therefore, the main control unit 11 performs control so that the print head 130 scans the scan width Wmeta=210.0 mm along the main scanning direction.

At S1510, the main control unit 11 instructs the sheet feed/discharge motor control unit 14 to convey a printing medium along the sub scanning direction. By this step, the printing medium is conveyed by a predetermined conveyance amount along the sub scanning direction. In this example, the predetermined conveyance amount is equal to the length corresponding to four nozzles arrayed along the sub scanning direction.

At S1511, the main control unit 11 updates the coordinate information indicating the position of the print head 130 in the main scanning direction.

At S1512, the main control unit 11 determines whether the processing at S1501 to S1511 corresponding to the data of one page acquired at S1500 is completed. In a case where determination results at S1512 are affirmative, the processing advances to S1513. On the other hand, in a case where the determination results are negative, the processing returns to S1501.

At S1513, the main control unit 11 determines whether the processing of all the pages included in the print job is completed. In this example, by this step, in a case where the processing for the data of one page included in the first print job is completed, the printing processing based on the first print job is terminated.

Following the above, the printing processing based on the second print job is started. Each piece of processing at S1500 to S1504 for the second print job is the same as that for the first print job.

At S1505, the main control unit 11 sets the area of nozzles to be used in each nozzle array of the print head 130. In this example, by this step, in the printing based on the second print job, the nozzles shown in FIG. 8B are used as a result. In detail, in the nozzle array of the metallic ink, the four nozzles, that is, the fifth to eighth nozzles from the front end indicated by solid black are used and in the nozzle array of the color ink, the four nozzles, that is, the ninth to twelfth nozzles from the front end indicated by slashes are used.

At S1506, the main control unit 11 derives the scan width Wmeta of the print head 130. Specifically, the main control unit 11 derives 210.0 mm as the scan width Wmeta, which is the same value as that in a case where there is dot data up to the maximum width in the main scanning direction for the printable area on the printing medium.

At S1507, the main control unit 11 derives the main scanning speed Vcr of the print head 130 by using expression (4) based on the scan width Wmeta derived at S1506. In this example, the pattern shown in FIG. 8B is used, and therefore, Vcr is derived as Vcr=(210.0/2.0)×{(0/4)+1}=105.0 mm/sec (=4.13 inch/sec).

Each piece of processing at S1508 to S1512 that follow is the same as that for the first print job.

At S1513, the main control unit 11 determines whether the processing of all the pages included in the print job is completed. In this example, by this step, in a case where the processing for the data of one page included in the second print job is completed, the printing processing based on the second print job is terminated. The above is the contents of the printing processing in the present embodiment.

About Effect of the Present Embodiment

By the present embodiment, it is made possible to attain both implementation of a high-quality metallic color representation and suppression of a reduction in the life of a nozzle.

Fourth Embodiment

In the first to third embodiments, the nozzles to be used are changed for each print job, but the timing of changing the nozzles to be used is not limited to this. For example, in a case where data of a plurality of pages is included in the print job, it may also be possible to change the nozzles to be used for each page or for each image within the same page. In the present embodiment, a case is explained where the nozzles to be used are changed for each page in the printing processing based on a print job to print a plurality of pages.

FIG. 16A and FIG. 16B are each a flowchart of the printing processing in the present embodiment. The CPU mounted on the main control unit 11 loads a program stored in the ROM onto the RAM and executes the loaded program. Due to this, each piece of processing in FIG. 16A and FIG. 16B is performed.

Here, a case is explained where at the time of performing printing processing based on a certain one print job, one of a plurality of kinds of pattern is used in order for each page included in the print job. Specifically, in the printing processing of the first page, a pattern in FIG. 17A is used, in the printing processing of the second page, a pattern in FIG. 17B is used, in the printing processing of the third page, a pattern in FIG. 17C is used, and in the printing processing of the fourth page, a pattern in FIG. 17D is used, respectively.

Further, the time difference target value Tmeta is taken to be 2.0 sec, the main scanning speed Vcr of the print head 130 is taken to be 635.0 mm/sec (=25.0 inch/sec), and the maximum value of the scan width in the main scanning direction of the print head 130 at the time of performing printing on a printing medium is taken to be 210.0 mm.

In the following, each step in FIG. 16A and FIG. 16B is explained. Each piece of processing at S1600 to S1603 is the same as each piece of processing at S700 to S703 in the first embodiment (see FIG. 7A).

At S1604, the main control unit 11 acquires used nozzle history information stored in the data buffer 16. The used nozzle history information is information including parameters indicating the number of times of use of each pattern of nozzles to be used for a plurality of kinds of pattern of nozzles to be used and in this example, the used nozzle history information includes (four) parameters indicating the number of times of use of each pattern shown in FIG. 17A to FIG. 17D.

At S1605, the main control unit 11 sets the area of nozzles to be used in each nozzle array of the print head 130 by using the used nozzle history information acquired at S1604. In detail, the pattern corresponding to the smallest value of the values of the parameters indicating the number of times of use of each pattern included in the used nozzle history information is used. Here, as described previously, in the printing processing based on the first print job, it is assumed that the nozzles shown in FIG. 17A are used.

Each piece of processing at S1606 to S1614 that follow is the same as each piece of processing at S705 to S713 in the first embodiment.

At S1615, the main control unit 11 updates the used nozzle history information. Specifically, the value of the parameter indicating the number of times of use of the pattern in FIG. 17A included in the used nozzle history information is incremented.

At S1616, the main control unit 11 determines whether the processing of all the pages included in the print job is completed. Here, an unprocessed page exists, and therefore, the processing returns to S1600 and the data of the next page (second page) is acquired.

After this, the processing at S1600 to S1616 for the data of the second page, the processing at S1600 to S1616 for the data of the third page, and the processing at S1600 to S1616 for the data of the fourth page are performed sequentially. In this example, in the printing processing of the second page, the pattern shown in FIG. 17B is used, in the printing processing of the third page, the pattern shown in FIG. 17C is used, and in the printing processing of the fourth page, the pattern shown in FIG. 17D is used. The above is the contents of the printing processing in the present embodiment.

About Effect of the Present Embodiment

By the present embodiment, it is made possible to attain both implementation of a high-quality metallic color representation and suppression of a reduction in the life of a nozzle.

Fifth Embodiment

In the embodiment described previously, the case is explained where changing the nozzles to be used of the metallic ink and the color ink causes the time difference (application time difference) between the timing of applying the metallic ink and the timing of applying the color ink to change. However, in a case where the length of the print head in the sub scanning direction is long and the number nozzles included in the nozzle array is large, there is a case where a predetermined application time difference is kept at all times even though the nozzles to be used are changed. In the present embodiment, the print head such as this is adopted. In the following, a case where the nozzles to be used are changed for each print job in the printing processing based on a plurality of print jobs is explained by taking an example.

In the following, a case is explained where the printing processing is performed in accordance with the flow shown in FIG. 7A and FIG. 7B for each of four print jobs to print the same metallic color image within one page. FIG. 18A to FIG. 18D are each a diagram schematically showing each nozzle array in the print head 130 adopted in the present embodiment and a pattern of nozzles to be used that is used in the present embodiment. In this example, it is assumed that the pattern in FIG. 18A is used for the first print job, the pattern in FIG. 18B is used for the second print job, the pattern in FIG. 18C is used for the third print job, and the pattern in FIG. 18D is used for the fourth print job, respectively.

Further, the time difference target value Tmeta is taken to be 2.0 sec, the main scanning speed Vcr of the print head 130 is taken to be 635.0 mm/sec (=25.0 inch/sec), and the maximum value of the scan width in the main scanning direction of the print head 130 at the time of performing printing on a printing medium is taken to be 210.0 mm.

In the following, each step in FIG. 7A and FIG. 7B is explained. In this example, first, as a result of that each piece of processing at S700 to S702 is performed for the first print job, the processing advances to S704.

At S704, the main control unit 11 sets the area of nozzles to be used in each nozzle array of the print head 130. As described previously, in the printing processing based on the first print job, the pattern shown in FIG. 18A is used.

At S705, the main control unit 11 derives the scan width Wmeta of the print head 130. In this example, the scan width Wmeta=210.0 mm is derived.

At S706, the main control unit 11 derives the time difference T1 by using expression (1). In this example, Wmeta=210.0 mm, Vcr=635.0 mm/sec, Nscan=3, and Nblank=9, and therefore, T1 is derived as T1=(210.0/635.0)×{(9/3)+1}=1.32 sec.

At S707, the main control unit 11 derives the time difference adjustment value Tscan by using expressions (2) and (3) based on the time difference target value Tmeta and the time difference T1. In this example, Tmeta=2.0 sec and T1=1.32 sec, and therefore, T2 is derived as T2=2.0−1.32=0.68 sec. Further, Nscan=3 and Nblank=9, and therefore, T scan is derived as Tscan=0.68/{(9/3)+1}=0.17 sec.

At S708, the main control unit 11 sets the time difference adjustment value Tscan (=0.17 sec) derived at S707 as a halt time of the print head 130 per printing scan. Each piece of processing at S709 to S713 that follow is performed and the printing processing of one page is completed.

At S714, the main control unit 11 determines whether the processing of all the pages included in the print job is completed. In this example, by this step, in a case where the processing of one page included in the print job is completed, the printing processing based on the first print job is terminated.

Following the above, the printing processing based on the second print job is started and the same processing as that for the first print job is performed for the second print job. As described previously, in the printing processing based on the second print job, the pattern in FIG. 18B is used. As a result of this, for the second print job, T1=1.32 sec, T2=0.68 sec, and Tscan=0.17 sec are derived, which are equal to each value derived at the time of the printing processing of the first print job. This is the same for the third print job and the fourth print job.

FIG. 19A to FIG. 19D are each a diagram schematically showing the printing operation in the specific example described previously. FIG. 19A shows the printing operation based on the first print job, FIG. 19B shows the printing operation based on the second print job, FIG. 19C shows the printing operation based on the third print job, and FIG. 19D shows the printing operation based on the fourth print job, respectively. As shown schematically, it is known that the halt time of the print head 130 per printing scan is the same value (0.17 sec) for all the print jobs.

About Effect, Modification Example of the Present Embodiment

By the present embodiment, it is made possible to attain both implementation of a high-quality metallic color representation and suppression of a reduction in the life of a nozzle to be used.

In the case described previously, as in the first embodiment and the like, the case is explained where the amount by which the time difference target value runs short only by the setting of the area of nozzles to be used is compensated for by the print head halt per printing scan, but the present embodiment is not limited to the aspect such as this. In a case where the print head is further longer and the number of nozzles included in the nozzle array is further larger, or in a case where the time difference target value is shorter depending on the printing medium or the ink to be used, or the like, there is a case where it is possible to produce a necessary application time difference only by the setting of the area of nozzles to be used. It is needless to say that the production of the time difference by the print head halt is not necessary in the case such as this.

Other Embodiments

In the embodiment described previously, the case is explained where the three color inks of C (cyan), M (magenta), and Y (yellow) are used as color inks, but the color inks are not limited to those. It may also be possible to use an arbitrary color ink, and for example, it may also be possible to use the inks of K (black), Gy (gray), Lc (light cyan), Lm (light magenta), and the like. Further, it may also be possible to use the inks of R (red), G (green), B (blue), and the like as the particular colors.

Further, in the aspect described previously, the case is explained where a high-quality metallic color representation is implemented by forming a color ink layer on a metallic ink layer, but the ink that forms the backing is not limited to the metallic ink. It is possible to apply the present invention to a case where, for example, the W (white) ink is ejected first as the backing and the color ink is ejected onto the backing with a time difference being provided in between at the time of ejecting the color ink to a colored printing medium or a printing medium whose transparency is high.

Further, it may also be possible to appropriately combine the embodiments described previously.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an ink jet printing apparatus that uses a metallic ink in addition to color inks, it is made possible to attain both a high-quality metallic color representation and suppression of a reduction in the life of a nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-093046 filed May 14, 2018, which is hereby incorporated by reference herein in its entirety.

What is claimed is:

1. A printing apparatus comprising:
a conveyance unit configured to convey a printing medium in a first direction;
a printing unit including a metallic array in which a plurality of printing elements for applying a metallic ink including metal particles is arrayed along the first direction and a color array in which a plurality of printing elements for applying a color ink including a color material is arrayed along the first direction;
a scan unit configured to cause the printing unit to scan a plurality of times in a second direction intersecting with the first direction for a predetermined area on a printing medium; and
a print control unit configured to control a printing operation so as to print a metallic color image by conveying a printing medium by the conveyance unit after applying the metallic ink to the predetermined area of the printing medium from a first element group included in the metallic array and by applying the color ink to the predetermined area from a second element group that is a printing element group included in the color array and which is located downstream of the first element group in the first direction,
wherein the print control unit controls the printing operation thereto in accordance with a position of the first element group and a position of the second element group in the first direction selectively using one of a plurality of different prestored patterns so that a time difference from application of the metallic ink by the first element group to the predetermined area until application of the color ink by the second element group to the predetermined area is longer than a necessary time for representation of the metallic color image, and
wherein each pattern determines an element which applies the metallic ink and which is used as the first element group and an element which does not apply the metallic ink and which is not used as the first element group out of the printing elements included in the metallic array; and an element which applies the color ink and which is used as the second element group and an element which does not apply the color ink and which is not used as the second element group out of the printing elements included in the color array, and
wherein the print control unit controls the printing operation based on the necessary time for the predetermined area derived based on one pattern to be used of the plurality of patterns.

2. The printing apparatus according to claim 1, wherein the print control unit controls the time difference for the predetermined area further based on a scanning speed by the scan unit and a scan length in the second direction.

3. The printing apparatus according to claim 2, wherein the print control unit controls the print operation by providing a standby time corresponding to the time difference between each scan by the scan unit.

4. The printing apparatus according to claim 2, wherein the print control unit sets the scan length by the scan unit for each area of a metallic color image formed by applying the color ink onto a metallic layer applied the metallic ink within the same page.

5. The printing apparatus according to claim 1, wherein the print control unit performs a scan at least once, which applies nothing to the predetermined area from the printing unit, after applying the metallic ink to the predetermined area from the first element group and before applying the color ink from the second element group.

6. The printing apparatus according to claim 1, wherein the print control unit controls the print operation so that a plurality of the time differences for each printing scan are the same.

7. The printing apparatus according to claim 1, wherein the print control unit controls a scanning speed of the scan unit based on the pattern and a scan length in the second direction of the scan unit.

8. The printing apparatus according to claim 7, wherein the print control unit controls the print operation by causing the scan unit to scan along the second direction at the scanning speed.

9. The printing apparatus according to claim 1, wherein in the print operation, at least a part of printing elements not ejecting ink in the metallic array and at least a part of printing elements not ejecting ink in the color array are at the same position in a second direction.

10. The printing apparatus according to claim 1, wherein the print control unit sets the first element group and the second element group for each print job, or for each page included in the print job, or for each image within the page.

11. The printing apparatus according to claim 1, wherein the print control unit sets a printing element group ejecting ink so that a pattern corresponding to the smallest value of values of parameters counting the number of times of use for each of the patterns is obtained.

12. A control method of a printing apparatus comprising: (a) a conveyance unit configured to convey a printing medium in a first direction; (b) a printing unit including a metallic array in which a plurality of printing elements for applying a metallic ink including metal particles is arrayed along the first direction and a color array in which a plurality of printing elements for applying a color ink including a color material is arrayed along the first direction; (c) a scan unit configured to cause the printing unit to scan a plurality of times in a second direction intersecting with the first direction for a predetermined area on a printing medium; and (d) a print control unit configured to control a printing operation so as to print a metallic color image by conveying a printing medium by the conveyance unit after applying the metallic ink to the predetermined area of the printing medium from a first element group included in the metallic array and by applying the color ink to the predetermined area from a second element group that is a printing element group included in the color array and which is located downstream of the first element group in the first direction, the control method comprising the step of:
  controlling the printing operation thereto in accordance with a position of the first element group and a position of the second element group in the first direction selectively using one of a plurality of different prestored patterns so that a time difference from application of the metallic ink by the first element group to the predetermined area until application of the color ink by the second element group to the predetermined area is longer than a necessary time for representation of the metallic color image,
  wherein each pattern determines an element which applies the metallic ink and which is used as the first element group and an element which does not apply the metallic ink and which is not used as the first element group out of the printing elements included in the metallic array; and an element which applies the color ink and which is used as the second element group and an element which does not apply the color ink and which is not used as the second element group out of the printing elements included in the color array, and
  wherein the controlling the printing operation controls the printing operation based on the necessary time for the predetermined area derived based on one pattern to be used of the plurality of patterns.

13. A printing apparatus comprising:
  a conveyance unit configured to convey a printing medium in a first direction;
  a printing unit including a metallic array in which a plurality of printing elements for applying a metallic ink including metal particles is arrayed along the first direction and a color array in which a plurality of printing elements for applying a color ink including a color material is arrayed along the first direction;
  a scan unit configured to cause the printing unit to scan a plurality of times in a second direction intersecting with the first direction for a predetermined area on a printing medium; and
  a print control unit configured to control a printing operation so as to print a metallic color image by conveying a printing medium by the conveyance unit after applying the metallic ink to the predetermined area of the printing medium from a first element group included in the metallic array and by applying the color ink to the predetermined area from a second element group that is a printing element group included in the color array and which is located downstream of the first element group in the first direction,
  wherein the print control unit controls the printing operation thereto in accordance with a position of the first element group and a position of the second element group in the first direction selectively using one of a plurality of different prestored patterns so that a time difference from application of the metallic ink by the first element group to the predetermined area until application of the color ink by the second element group to the predetermined area is longer than a necessary time for representation of the metallic color image,
  wherein each pattern determines an element which applies the metallic ink and which is used as the first element group and an element which does not apply the metallic ink and which is not used as the first element group out of the printing elements included in the metallic array; and an element which applies the color ink and which is used as the second element group and an element which does not apply the color ink and which is not used as the second element group out of the printing elements included in the color array,
  wherein the plurality of patterns include a first pattern and a second pattern,
  wherein in the first pattern, a first predetermined number of printing elements arrayed along the first direction from an end on an upstream side in the first direction are used as the first element group, and the first predetermined number of printing elements arrayed along the first direction from an end on a downstream side in the first direction are used as the second element group,
  wherein in the second pattern, the first predetermined number of printing elements arrayed along the first direction on the downstream side ahead of the printing elements used as the first element group in the first pattern are used as the first element group, and the first predetermined number of printing elements arrayed along the first direction ahead of the printing elements used as the second element group in the first pattern are used as the second element group, and
  wherein the necessary time for the second pattern is longer than the necessary time for the first pattern.

14. A printing apparatus comprising:
  a conveyance unit configured to convey a printing medium in a first direction;
  a printing unit including a metallic array in which a plurality of printing elements for applying a metallic ink including metal particles is arrayed along the first direction and a color array in which a plurality of printing elements for applying a color ink including a color material is arrayed along the first direction;
  a scan unit configured to cause the printing unit to scan a plurality of times in a second direction intersecting with the first direction for a predetermined area on a printing medium; and
  a print control unit configured to control a printing operation so as to print a metallic color image by conveying a printing medium by the conveyance unit after applying the metallic ink to the predetermined area of the printing medium from a first element group included in the metallic array and by applying the color ink to the predetermined area from a second element group that is a printing element group included in the color array and which is located downstream of the first element group in the first direction,
  wherein the print control unit controls the printing operation thereto in accordance with a position of the first element group and a position of the second element group in the first direction selectively using one of a plurality of different prestored patterns so that a time difference from application of the metallic ink by the first element group to the predetermined area until application of the color ink by the second element group to the predetermined area is longer than a necessary time for representation of the metallic color image,
  wherein each pattern determines an element which applies the metallic ink and which is used as the first element group and an element which does not apply the metallic ink and which is not used as the first element group out of the printing elements included in the metallic array;

and an element which applies the color ink and which is used as the second element group and an element which does not apply the color ink and which is not used as the second element group out of the printing elements included in the color array, wherein the plurality of patterns include a first pattern and a second pattern, wherein in the first pattern, a first predetermined number of printing elements arrayed along the first direction from an end on an upstream side in the first direction are used as the first element group, and the first predetermined number of printing elements arrayed along the first direction from an end on a downstream side in the first direction are used as the second element group, wherein in the second pattern, a second predetermined number of printing elements arrayed along the first direction from the end on the upstream side in the first direction are used as the first element group, the second predetermined number of printing elements arrayed along the first direction from the end on the downstream side in the first direction are used as the second element group, and the second predetermined number is larger than the first predetermined number, and wherein the necessary time for the second pattern is longer than the necessary time for the first pattern.

15. A printing apparatus comprising:

a conveyance unit configured to convey a printing medium in a first direction;

a printing unit including a metallic array in which a plurality of printing elements for applying a metallic ink including metal particles is arrayed along the first direction and a color array in which a plurality of printing elements for applying a color ink including a color material is arrayed along the first direction;

a scan unit configured to cause the printing unit to scan a plurality of times in a second direction intersecting with the first direction for a predetermined area on a printing medium; and a print control unit configured to control a printing operation so as to print a metallic color image by conveying a printing medium by the conveyance unit after applying the metallic ink to the predetermined area of the printing medium from a first element group included in the metallic array and by applying the color ink to the predetermined area from a second element group that is a printing element group included in the color array and which is located downstream of the first element group in the first direction, wherein the print control unit controls the printing operation thereto in accordance with a position of the first element group and a position of the second element group in the first direction selectively using one of a plurality of different prestored patterns so that a time difference from application of the metallic ink by the first element group to the predetermined area until application of the color ink by the second element group to the predetermined area is longer than a necessary time for representation of the metallic color image, wherein each pattern determines an element which applies the metallic ink and which is used as the first element group and an element which does not apply the metallic ink and which is not used as the first element group out of the printing elements included in the metallic array; and an element which applies the color ink and which is used as the second element group and an element which does not apply the color ink and which is not used as the second element group out of the printing elements included in the color array, wherein the plurality of patterns include a first pattern, a second pattern, a third pattern, and a fourth pattern, wherein in the first pattern, a first predetermined number of printing elements arrayed along the first direction from an end on an upstream side in the first direction are used as the first element group, and the first predetermined number of printing elements arrayed along the first direction from an end on a downstream side in the first direction are used as the second element group, wherein in the second pattern, the first predetermined number of printing elements arrayed along the first direction ahead of the printing elements used as the first element group in the first pattern are used as the first element group, and the first predetermined number of printing elements arrayed along the first direction ahead of the printing elements used as the second element group in the first pattern are used as the second element group, wherein in the third pattern, the same first element group as in the first pattern is used, and the same second element group as in the second pattern is used, and wherein in the fourth pattern, the same first element group as in the second pattern is used, and the same second element group as in the first pattern is used.

* * * * *